(12) United States Patent
Kozaki

(10) Patent No.: US 10,496,112 B2
(45) Date of Patent: Dec. 3, 2019

(54) VALVE DEVICE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 75 days.

(21) Appl. No.: 15/952,322

(22) Filed: Apr. 13, 2018

(65) Prior Publication Data

US 2019/0196516 A1  Jun. 27, 2019

(30) Foreign Application Priority Data

Dec. 26, 2017  (JP) ................. 2017-250131

(51) Int. Cl.
*G05D 16/20* (2006.01)
*F16K 37/00* (2006.01)
*G05D 7/06* (2006.01)

(52) U.S. Cl.
CPC ....... *G05D 16/202* (2013.01); *F16K 37/0041* (2013.01); *G05D 7/0623* (2013.01); *G05D 7/0635* (2013.01); *Y10T 137/7761* (2015.04)

(58) Field of Classification Search
CPC ............... G05D 7/0623; G05D 7/0635; G05D 16/2006; G05D 16/2013; G05D 16/202; F16K 37/0041; Y10T 137/7761
USPC ...................................................... 137/487.5
See application file for complete search history.

(56) References Cited

U.S. PATENT DOCUMENTS

| | | | | |
|---|---|---|---|---|
| 3,315,250 A | * | 4/1967 | Higgins, Jr. | H03M 1/00 341/151 |
| 4,456,038 A | * | 6/1984 | Gwaltney | B60S 5/046 137/102 |
| 5,220,940 A | * | 6/1993 | Palmer | B08B 15/023 137/487.5 |
| 5,431,182 A | * | 7/1995 | Brown | G05B 6/05 137/487.5 |
| 5,687,098 A | * | 11/1997 | Grumstrup | G05B 23/0221 700/282 |
| 5,944,049 A | * | 8/1999 | Beyer | F04B 49/08 137/14 |
| 6,138,564 A | * | 10/2000 | Eckardt | B65H 23/245 101/228 |
| 6,142,163 A | * | 11/2000 | McMillin | G05D 16/2013 137/114 |

(Continued)

FOREIGN PATENT DOCUMENTS

JP  4630994  2/2011

*Primary Examiner* — William M McCalister
(74) *Attorney, Agent, or Firm* — Renner, Otto, Boisselle & Sklar, LLP

(57) ABSTRACT

A valve device comprises an opening degree detection section and a control section. The control section performs, according to the pressure value and the opening degree detected by the opening degree detection unit, either one of open control for performing rough adjustment of the opening degree of the valve body or close control for performing fine adjustment of the opening degree of the valve body, in the open control, a predictive pressure estimation value at a preset future prediction target time from a current point is estimated, and the rough adjustment is performed based on the predictive pressure estimation value and the target pressure value, and in the close control, the fine adjustment is performed based on the target pressure value and the pressure value.

13 Claims, 12 Drawing Sheets

(56) References Cited

U.S. PATENT DOCUMENTS

| | | | |
|---|---|---|---|
| 6,779,541 B2* | 8/2004 | Inayama | G05D 16/2095 137/102 |
| 7,861,740 B2* | 1/2011 | Phallen | F16K 7/045 137/487.5 |
| 8,070,459 B2 | 12/2011 | Tollner | |
| 8,210,196 B2* | 7/2012 | Itafuji | H01L 21/6719 137/110 |
| 8,833,388 B2* | 9/2014 | Eto | H01L 21/67253 137/487.5 |
| 8,910,650 B2* | 12/2014 | Andersen | F16K 1/54 137/15.06 |
| 10,386,861 B2* | 8/2019 | Hirata | G01F 1/6965 |
| 2002/0109115 A1* | 8/2002 | Cederstav | G05D 16/202 251/129.04 |
| 2006/0021656 A1* | 2/2006 | Kajitani | G05D 16/202 137/487.5 |
| 2007/0151321 A1* | 7/2007 | Ohmi | G01L 19/0023 73/1.62 |
| 2010/0139775 A1* | 6/2010 | Ohmi | G01F 1/363 137/12 |
| 2012/0000542 A1* | 1/2012 | Eto | G05D 7/0623 137/10 |
| 2012/0298220 A1* | 11/2012 | Hidaka | G01F 1/363 137/468 |
| 2013/0081702 A1* | 4/2013 | Mohammed | F17D 3/00 137/2 |
| 2013/0092243 A1* | 4/2013 | Mohammed | G01F 25/0053 137/2 |
| 2013/0183443 A1* | 7/2013 | Hirose | H03K 21/023 427/248.1 |
| 2014/0130907 A1* | 5/2014 | Watanabe | G05D 16/2086 137/487.5 |
| 2014/0182692 A1* | 7/2014 | Hirata | G01F 25/0007 137/10 |
| 2014/0190571 A1* | 7/2014 | Ding | G05D 7/0635 137/1 |
| 2016/0033973 A1* | 2/2016 | Takijiri | G05D 7/0635 137/10 |
| 2017/0185091 A1* | 6/2017 | Johnson | G01F 25/0007 |
| 2017/0294333 A1* | 10/2017 | Iu | G05D 7/0635 |

* cited by examiner

VALVE DEVICE

BACKGROUND OF THE INVENTION

1. Technical Field

The present invention relates to a valve device provided between a vacuum chamber and a vacuum pump and used for vacuum chamber pressure adjustment.

2. Background Art

In a vacuum processing device such as an etching device, a chamber inner pressure normally varies according to a processing stage (e.g., in the middle of a process or before/after the process). Thus, in such a vacuum processing device, a conductance variable valve is provided between a vacuum chamber and a vacuum pump to adjust a pressure. A valve as described in Patent Literature 1 (JP 4630994) has been known as an example of the above-described valve.

In the case of changing a target vacuum chamber pressure setting, it has been demanded that the pressure reaches a changed target pressure value as soon as possible and is stabilized at such a value. A method described in Patent Literature 2 (U.S. Pat. No. 8,070,459) has been known as the above-described method. In the method described in Patent Literature 2, a gas introducer is provided downstream of a vacuum pump to separately introduce gas. In this manner, the exhaust velocity of the vacuum pump is decreased, thereby handling a pressure overshoot phenomenon upon a change in a target pressure value.

However, in the technique described in Patent Literature 2, there is a disadvantage that the gas introducer needs to be newly provided. For determining an introduced gas flow rate and a gas introduction period, a known repeated process is a precondition. Further, for the vacuum chamber equipped with a valve, adjustment and setting of the gas flow rate and the gas introduction period need to be made, leading to extremely-complicated processing.

SUMMARY OF THE INVENTION

A valve device provided between a vacuum chamber and a vacuum pump and configured to change an opening degree of a valve body to change a conductance, comprises: an opening degree detection section configured to detect the opening degree of the valve body; and a control section configured to control, based on a pressure value of the vacuum chamber and the opening degree detected by the opening degree detection section, the opening degree of the valve body such that the pressure value approaches a target pressure value, the pressure value and the target pressure value being input to the control section. The control section performs, according to the pressure value and the opening degree detected by the opening degree detection unit, either one of open control for performing rough adjustment of the opening degree of the valve body or close control for performing fine adjustment of the opening degree of the valve body, in the open control, a predictive pressure estimation value at a preset future prediction target time from a current point is estimated, and the rough adjustment is performed based on the predictive pressure estimation value and the target pressure value, and in the close control, the fine adjustment is performed based on the target pressure value and the pressure value.

The control section performs open degree control in the open control and the close control based on a magnitude relationship between a reference opening degree for the target pressure value and the detected opening degree and a magnitude relationship between the target pressure value and the pressure value.

The control section divides an opening degree/pressure coordinate plane represented by an opening degree coordinate and a pressure coordinate into four regions of first, second, third, and fourth quadrants by a pressure coordinate axis and an opening degree coordinate axis passing through a target coordinate point represented by the reference opening degree and the target pressure value, and differentiates the opening degree control depending on whether a coordinate point represented by the detected opening degree and the pressure value is in the first, second, third, or fourth quadrant.

In the open control, the opening degree control is performed by any of a first opening degree control pattern, a second opening degree control pattern, and a third opening degree control pattern according to a position of the coordinate point, in the first opening degree control pattern, in the first quadrant, the opening degree of the valve body is increased or held when the predictive pressure estimation value exceeds the target pressure value, and is decreased when the predictive pressure estimation value is equal to or smaller than the target pressure value, in the second quadrant, the opening degree of the valve body is increased, and in the fourth and third quadrants, the opening degree of the valve body is decreased, in the second opening degree control pattern, in the third quadrant, the opening degree of the valve body is increased when the predictive pressure estimation value exceeds the target pressure value, and is decreased or held when the predictive pressure estimation value is equal to or smaller than the target pressure value, in the fourth quadrant, the opening degree of the valve body is decreased, and in the first and second quadrants, the opening degree of the valve body is increased, and in the third opening degree control pattern, in the first quadrant, the opening degree of the valve body is increased or held when the predictive pressure estimation value exceeds the target pressure value, and is decreased when the predictive pressure estimation value is equal to or smaller than the target pressure value, in the third quadrant, the opening degree of the valve body is increased when the predictive pressure estimation value exceeds the target pressure value, and is decreased or held when the predictive pressure estimation value is equal to or smaller than the target pressure value, in the second quadrant, the opening degree of the valve body is increased, and in the fourth quadrant, the opening degree of the valve body is decreased.

Based on whether or not the coordinate point is included in a region including the target coordinate point and set by a predetermined opening degree threshold and a predetermined pressure threshold, the control section determines whether the close control or the open control is to be performed.

The region set by the predetermined pressure threshold is a range of a predetermined pressure deviation around the target pressure value, the control section switches between the close control and the open control based on whether or not the pressure value is within the predetermined pressure deviation, and in a case where the open control is switched to the close control, the predetermined pressure deviation in the first and third quadrants is smaller than that in the second and fourth quadrants.

A target opening degree estimation value when it is assumed that the pressure value reaches the target pressure value by a change in the opening degree of the valve body is used as the reference opening degree.

The control section determines switching from the open control to the close control based on whether or not the detected opening degree is within a predetermined opening degree range around the target opening degree estimation value, and sets a larger predetermined opening degree range for a lower estimation accuracy of the target opening degree estimation value.

The control section performs the close control after the opening degree of the valve body has been changed to the reference opening degree by the open control.

The control section switches the close control to the open control when a difference between the pressure value and the target pressure value exceeds a predetermined pressure threshold upon the fine adjustment by the close control.

The predictive pressure estimation value is computed in such a manner that a planned opening degree value indicating a temporarily-set process until the prediction target time in an opening degree changing process from the detected opening degree to the reference opening degree and an introduced gas flow rate estimation value obtained according to an exhaust expression of $V \times (dP/dt) + S \times P = Qin$ or an introduced gas flow rate input value as introduced gas flow rate information input from other components than the valve device are applied to a relational expression obtained by discretization of a general solution of the exhaust expression, where V is a volume of the vacuum chamber, P is a pressure of the vacuum chamber, S is an exhaust velocity according to an opening degree, and Qin is a flow rate of gas introduced into the vacuum chamber.

The predictive pressure estimation value is set and computed in such a manner that a current value of the detected opening degree is fixed during the prediction target time and a current estimation value of the introduced gas flow rate input value or the introduced gas flow rate estimation value is fixed.

The prediction target time is, with reference to a drive time required for a change in the valve body opening degree between a minimum value and a maximum value of the valve conductance, set to once to 0.1 times of the drive time.

According to the present invention, the pressure can be adjusted promptly and stably without a new tool for gas introduction etc. when the target pressure value of the vacuum chamber is changed.

DETAILED DESCRIPTION OF THE EXEMPLARY EMBODIMENTS

Hereinafter, embodiments of the present invention will be described with reference to the drawings.

First Embodiment

Figure 1:
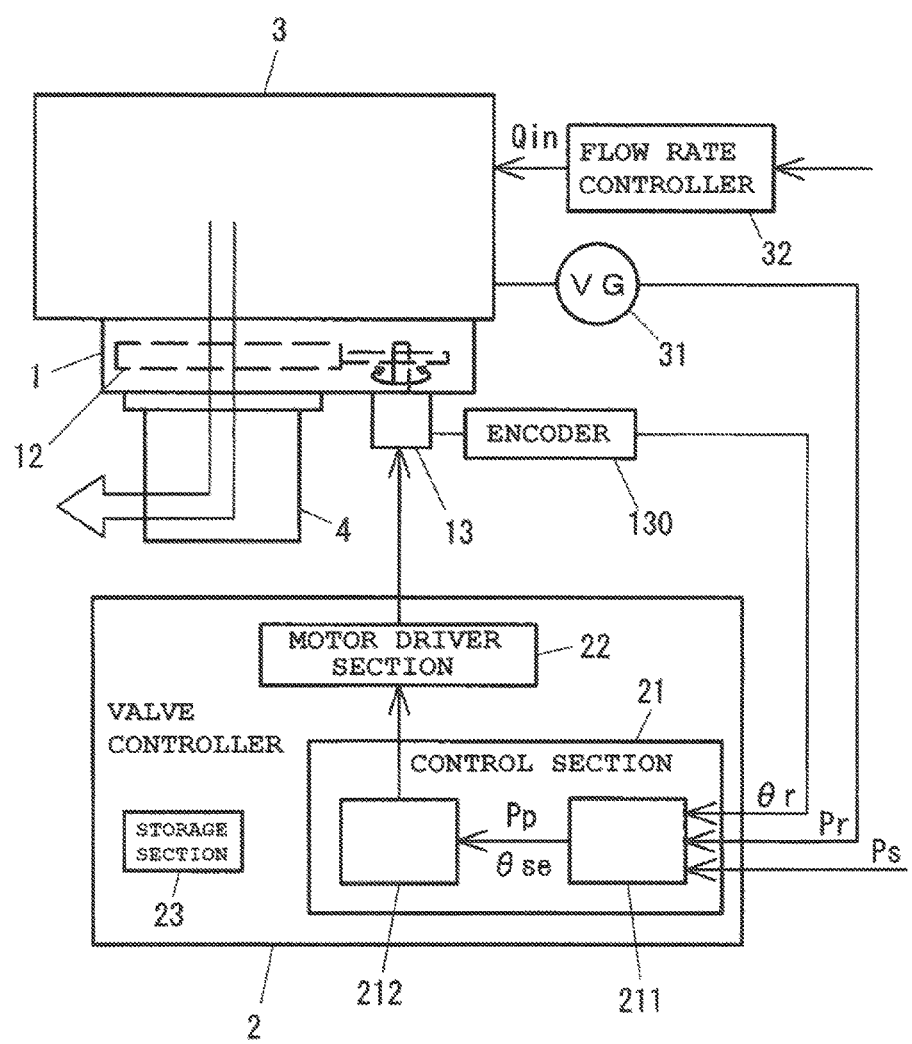
FIG. 1 is a block diagram of an outline configuration of a valve device.

FIG. 1 is a diagram of a first embodiment of a valve device of the present invention, FIG. 1 being a block diagram of an outline configuration of the valve device. The valve device includes a valve unit 1 and a valve controller 2 configured to control the valve unit 1. In an example illustrated in FIG. 1, the valve unit 1 is attached to a vacuum chamber 3 of a vacuum device, and a vacuum pump 4 is fixed to the valve unit 1. That is, exhausting from the vacuum chamber 3 is performed by the vacuum pump 4 via the valve unit 1.

Figure 2:
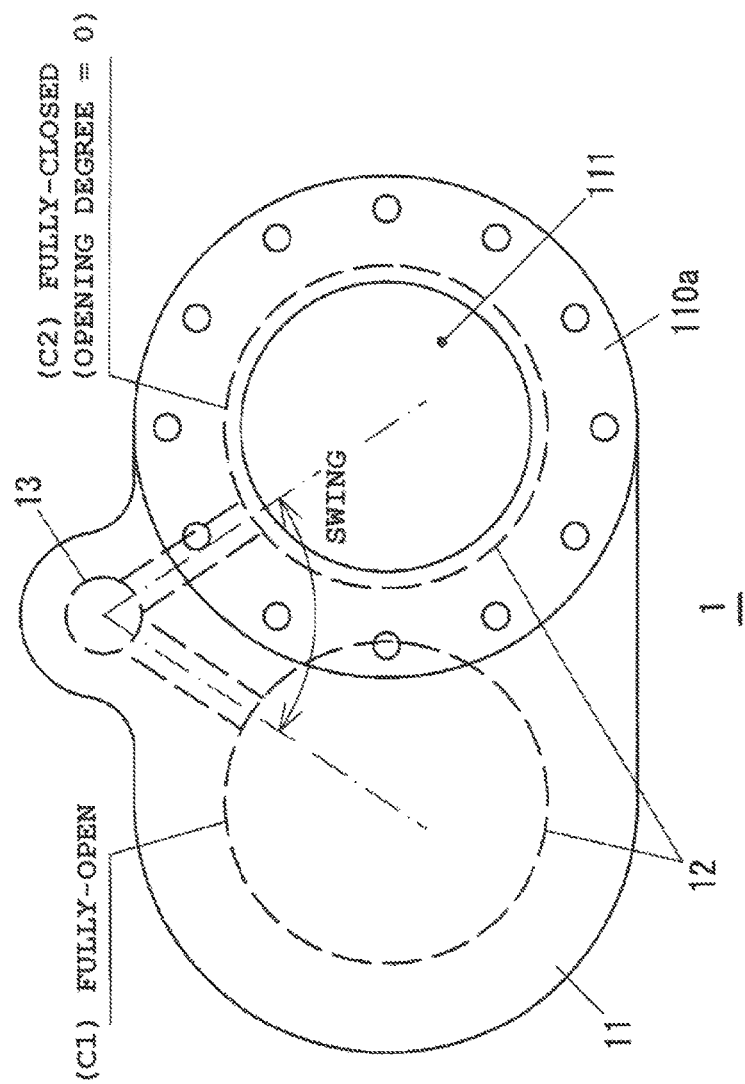
FIG. 2 is a plan view of a valve unit.

FIG. 2 is a plan view of the valve unit 1 from a vacuum chamber side. In a housing 11 of the valve unit 1, a valve plate 12 to be swingably driven by a motor 13 is provided. A flange surface 110a to be fixed to the vacuum chamber 3 is formed at the housing 11. Although not shown in the figure, a flange surface to be fixed to the vacuum pump 4 is formed on the opposite side (a side to be fixed to the vacuum pump 4) of the housing 11. Openings formed at these flange surfaces in a pair are arranged concentrically, and form a valve opening 111 as a gas flow path.

The valve plate 12 is swingably driven by the motor 13, thereby slidably moving the valve plate 12 to an optional position between a fully-closed position C2 at which the valve plate 12 faces the entirety of the valve opening 111 such that a conductance is minimum and a fully-open position C1 at which the valve plate 12 does not face the valve opening 111 at all such that the conductance is maximum. A closing state of the valve opening 111 by the valve plate 12 is represented by a parameter called an opening degree. The opening degree is that a ratio=(Swing Angle of Valve Plate):(Swing Angle from Fully-Closed State to State of Opening Entirety of Valve Opening 111) is converted to percentage. The opening degree is 0% at the fully-closed position C2 of FIG. 2, and is 100% at the fully-open position C1. That is, the valve unit 1 of the present embodiment adjusts the opening degree of the valve plate 12 so that the conductance can be controlled.

Returning to FIG. 1, the motor 13 is provided with an encoder 130 configured to detect the swing angle of the valve plate 12. A detection signal of the encoder 130 is input to the valve controller 2. Gas such as process gas is introduced into the vacuum chamber 3 via a flow rate controller 32. The flow rate controller 32 has the function of detecting the flow rate Qin of the introduced gas, and a flow rate detection value is input to a main control section (not shown) provided at the vacuum device. The pressure of the vacuum chamber 3 is measured by a vacuum meter 31. Such a pressure measurement value (hereinafter also sometimes referred to as a "current pressure value") Pr is input to the valve controller 2.

The valve controller 2 configured to control the valve unit 1 includes a control section 21, a motor driver section 22, and a storage section 23. The control section 21 is provided with an arithmetic estimation section 211 and a pressure adjustment control section 212. The opening degree of the valve plate 12 is controlled in such a manner that rotation of the motor 13 is controlled by the motor driver section 22.

In the case of performing an etching process or a film formation process in the vacuum chamber, the processing is performed with a pressure (a target pressure value) corresponding to each process. In a case where a setting of the target pressure value of the vacuum chamber is changed, the pressure needs to reach the changed target pressure value as soon as possible and to be stabilized at such a changed target pressure value. Such a change in the target pressure value is performed in such a manner that the conductance of a valve (a conductance variable valve) provided between the vacuum chamber and the vacuum pump is changed. Needless to say, the flow rate of the introduced gas is also changed to that according to the process, and therefore, it is not easy that the valve conductance is controlled to cause the pressure to promptly reach a desired target pressure value. In the present invention, the time taken for bringing the target pressure value is shortened by control as described below.

In a case where the valve unit 1 is provided between the vacuum pump 4 and the vacuum chamber 3 as in FIG. 1, a relationship among an effective exhaust velocity Se from the vacuum chamber 3, the exhaust velocity Sp of the vacuum pump 4, and the conductance Cv of the valve unit 1 as in Expression (1) below is satisfied:

$$1/Se = 1/Sp + 1/Cv \qquad (1)$$

Thus, the effective exhaust velocity Se is represented by Expression (2) below. When the flow rate of gas introduced into the vacuum chamber 3 is Qin, the inner pressure P of the vacuum chamber 3 in a pressure stable state is represented by Expression (3) below. That is, a greater conductance Cv of the valve unit 1 results in a lower pressure P. Conversely, a smaller conductance Cv results in a higher pressure P.

$$Se = Sp/\{1+(Sp/Cv)\} \qquad (2)$$

$$P = Qin/Se = (Qin/Sp)\cdot\{1+(Sp/Cv)\} \qquad (3)$$

Next, pressure adjustment control in the present embodiment will be described. Although will be described later in detail, the outline of the pressure adjustment control of the present embodiment is as follows:
(A) a future (t seconds later as a prediction target time: 0.4 seconds, for example) predictive pressure estimation value is sequentially computed (in this example, computing is sequentially performed every sampling period of $\Delta t1$ seconds (e.g., 10 msec));
(B) an opening degree changing direction in the pressure adjustment control is determined based on the calculated predictive pressure estimation value and the target pressure value; and
(C) coarse adjustment is performed by open control to promptly change the pressure to the vicinity of the target pressure value in a case where the current pressure value of the vacuum chamber 3 measured by the vacuum meter 31 greatly deviates from the target pressure value, and meanwhile, fine adjustment is performed by close control to change the current pressure value closer to the target pressure value and stabilize the current pressure value when the measured pressure value is brought into a range in the vicinity of the target pressure value.

Figure 3:
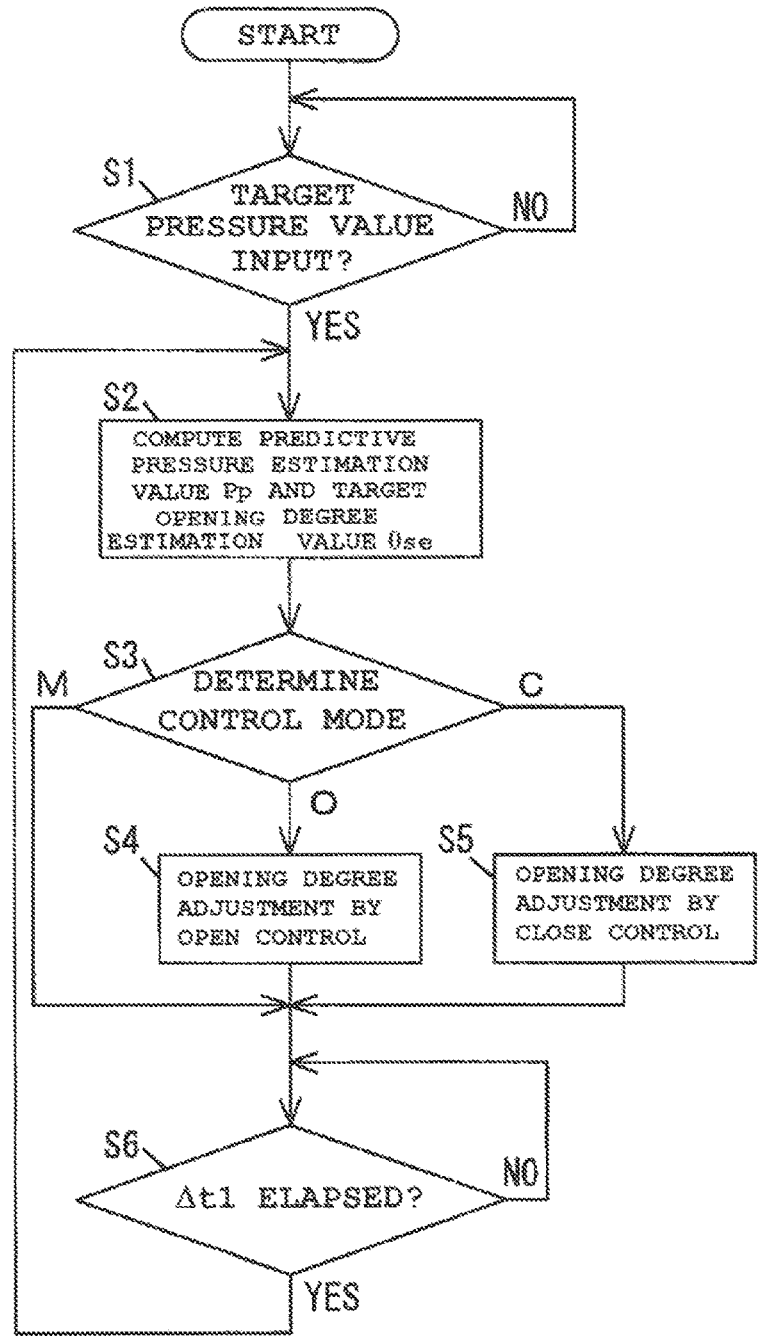
FIG. 3 is a flowchart for describing opening degree adjustment operation in a first embodiment.

FIG. 3 is a flowchart for describing opening degree adjustment operation in the present embodiment. A series of events of the opening degree adjustment operation will be herein described in outline with reference to FIG. 3, and details of processing at each step will be described later. When a power source of the valve controller 2 is turned on, the control section 21 starts control of FIG. 3. At a step S1, it is determined whether or not a target pressure value Ps set from a device-side controller is input. When the target pressure value Ps is input, the processing proceeds to a step S2. In an opening degree changing process from a current opening degree value θr measured by the encoder 130 to a target opening degree estimation value θse as an estimated opening degree on the assumption that the pressure value reaches the target pressure value, a process for next t seconds is, at the step S2, temporarily set as a planned opening degree value, and a predictive pressure estimation value Pp at t seconds later from a current point as a reference point is computed based on the planned opening degree value. The predictive pressure estimation value and the target opening degree estimation value are computed by the arithmetic estimation section 211 of FIG. 1. Details of computing of the predictive pressure estimation value and the target opening degree estimation value will be described later.

Based on the target pressure value Ps, the current pressure value Pr measured by the vacuum meter 31, the current opening degree value θr measured by the encoder 130, and the target opening degree estimation value θse computed by the arithmetic estimation section 211, it is, at a step S3, determined whether a control mode for opening degree adjustment is performed by open control (O), close control (C), or dead zone control (M). Details of the method for determining the control mode will be described later.

When it is determined as the open control (O) at the step S3, the processing proceeds to a step S4 to adjust the opening degree by the open control. When it is determined as the close control (C) at the step S3, the processing proceeds to a step S5 to adjust the opening degree by the close control. Alternatively, when it is determined as the dead zone control (M) at the step S3, the opening degree is maintained, and the processing proceeds to a step S6. At the step S6, it is determined whether or not the predetermined time $\Delta t1$ has elapsed after the start of computing of the predictive pressure estimation value of the step S2. When it is determined that the predetermined time $\Delta t1$ has elapsed, the processing proceeds to the step S2.

As described above, a series of the processing from the step S2 to the step S6 is repeatedly performed at an interval of the predetermined time $\Delta t1$ as the sampling period. Further, even after the current pressure value Pr has reached the target pressure value Ps, the processing from the step S2 to the step S6 is repeated, and control is made such that the inner pressure (the current pressure value Pr) of the vacuum chamber 3 is constantly maintained at the target pressure value Ps. In a case where the target pressure value has changed, the predictive pressure estimation value is computed at the step S2 based on the changed target pressure value Ps, and the opening degree is adjusted such that the current pressure value Pr promptly reaches the target pressure value Ps.

(Step S2: Computing of Predictive Pressure Estimation Value)

Details of computing of the predictive pressure estimation value at the step S2 will be described. An expression for exhausting as represented by Expression (4) below is used for calculation of the predictive pressure estimation value. In Expression (4), V represents the volume of the vacuum chamber 3, P represents the inner pressure of the vacuum chamber 3, and Qin represents the flow rate of gas introduced into the vacuum chamber 3, and S represents an effective exhaust velocity.

$$V \times (dP/dt) + S \times P = Qin \quad (4)$$

Note that the effective exhaust velocity S is the same as the above-described effective exhaust velocity Se. The effective exhaust velocity Se depends on the opening degree θ of the valve unit 1 and the introduced gas flow rate Qin. Moreover, the volume V of the vacuum chamber 3 is obtained in advance, and is stored in the storage section 23. For example, in auto-tuning of the valve unit 1 upon start-up of the entirety of the vacuum device, gas is introduced into the chamber, and is measured by a build-up method. A general solution of Expression (4) is represented by Expression (5) below.

$$P(t) = P0 \times \exp\{(-S/V) \times t\} + (1/V) \times \int_0^t Qin(\tau) \times \exp\{(-S/V) \times (t-\tau)\} d\tau \quad (5)$$

For example, discretization relations (6), (7) as described below are used as the method for calculating, according to Expression (5), the predictive pressure estimation value Pp at t seconds later from the current point as the reference point. Using Expressions (6), (7), a recurrence relation is obtained at Δt intervals until a lapse of t seconds after the current point as the reference point, and the predictive pressure estimation value Pp at t seconds later is obtained. When k=1 to 99 is satisfied and t seconds are 0.4 seconds, Δt=4 msec is satisfied.

$$P(\Delta t \text{ later}) = Cp(\text{current}) \times P(\text{current}) + Cq(\text{current}) \times \{Qine(\text{current}) + A \times \Delta t\} \quad (6)$$

$$P((k+1) \times \Delta t) = Cp(k) \times P(k \times \Delta t) + Cq(k) \times \{Qine(\text{current}) + A \times k \times \Delta t\} \quad (7)$$

where $Cp(k) = \exp\{(-S(k \times \Delta t)/V) \times \Delta t\}$
$Cq(k) = (1/V) \times \{1/(-S(k \times \Delta t)/V)\} \times (Cp(k)-1)$ For calculating the predictive pressure estimation value Pp at t seconds later by means of Expressions (6), (7), a flow rate estimation value Qine until a lapse of t seconds after the current point and the exhaust velocity S until a lapse of t seconds after the current point are necessary. For example, {Qine (current)+A×k×Δt} represents the flow rate estimation value after a lapse of k×Δt seconds from the current point in Expression (7). A case where the flow rate changes as in A×k×Δt is assumed herein, where A is a constant and is obtained by A={Qine(current)−Qine(previous)}/Δt2. In this expression, Δt2 is a constant time, and Δt2 and A will be described later. Note that the exhaust velocity S(k×Δt) in Expressions (6), (7) depends on the planned opening degree value, and therefore, the planned opening degree value until a lapse of t seconds after the current point is necessary for obtaining the exhaust velocity S until a lapse of t seconds after the current point.

(Computing of Flow Rate Estimation Value Qine(Current)

In computing of the flow rate estimation value, the current flow rate estimation value Qine(current) is estimated using Expression (4). As described above, the exhaust velocity S (the effective exhaust velocity) from the vacuum chamber 3 depends on the opening degree θ of the valve unit 1. Moreover, the exhaust velocity S also depends on the flow rate Qin of gas flowing into the vacuum chamber 3. A relational expression indicating a relationship among the flow rate Qin, the opening degree θ, and the exhaust velocity S as described above or a discretized map (hereinafter referred to as an "exhaust velocity map S(Qin, θ)") of such an expression is stored in advance in the storage section 23. Unlike the target pressure value Ps, information on the flow rate Qin is not normally input from the device controller to the valve controller 2. Thus, for the flow rate Qin necessary for computing of the predictive pressure estimation value, arithmetic estimation needs to be performed in the valve controller 2. In this case, such estimation is performed using the exhaust velocity map S(Qin, θ). Note that in a case where the information (an introduced gas flow rate input value) on the flow rate Qin is specially obtained from the device controller, the obtained introduced gas flow rate input value may be directly used as the value of the flow rate Qin.

The arithmetic estimation section 211 extracts, from the input current opening degree (a current opening degree value) θr and the flow rate estimation value Qine, a current exhaust velocity S (current) with reference to the exhaust velocity map S (Qin, θ). The flow rate estimation value Qine (previous) used in computing of the predictive pressure estimation value at a previous sampling period is herein used as the flow rate estimation value Qine. Note that arithmetic flow rate estimation is performed every sampling period, and therefore, an initial value may be Qine=0 for the sake of convenience.

Next, a pressure difference value dP/dt(current) between the current pressure value Pr(current) and the pressure value Pr(previous) measured the certain time interval Δt1 before is calculated using Expression (8) below. Note that in the case of initial computing of the predictive pressure estimation value, dP/dt(current)=0 is satisfied. The pressure difference value dP/dt(current), the extracted exhaust velocity S(current), and the pressure value Pr(current) are substituted into Expression (4) described above, and in this manner, the current flow rate estimation value Qine(current) is calculated as in Expression (9) below.

$$dP/dt(\text{current}) = \{Pr(\text{current}) - Pr(\text{previous})\}/\Delta t1 \quad (8)$$

$$Qine(\text{current}) = V \times (dP/dt(\text{current})) + S(\text{current}) \times Pr(\text{current}) \quad (9)$$

(Computing of Flow Rate Estimation Value for Next t Seconds)

First, a difference value between the above-described current flow rate estimation value Qine(current) and the previous flow rate estimation value Qine (previous) obtained the certain time interval Δt2 before is taken as the slope of the change in the flow rate. The flow rate difference value ΔQine/Δt2 is calculated using Expression (10) below. Note that in the case of initial computing of the predictive pressure estimation value, ΔQine/Δt2=0 is satisfied as in Qine=0.

$$\Delta Qine/\Delta t2 = \{Qine(\text{current}) - Qine(\text{previous})\}/\Delta t2 \quad (10)$$

The flow rate estimation value Qine(current) is herein taken as a current value, and linear extrapolation is performed using the above-described flow rate difference value ΔQine/Δt2 as a slope such that the flow rate estimation value for next t seconds is obtained every Δt. That is, settings are made as in Qine(current), Qine(current)+(ΔQine/Δt2)×Δt, Qine(current)+(ΔQine/Δt2)×2Δt, . . . . In Expressions (6), (7) described above, ΔQine/Δt2 is represented by a reference numeral "A." Note that due to linear extrapolation, Δt2 is, considering error fluctuation, a relatively-long time interval of about several to several tens of the sampling period Δt1.

(Computing of Target Opening Degree Estimation Value θse)

As described above, the coefficients Cp(k), Cq(k) of Expressions (6), (7) include the exhaust velocity S(k×Δt) in every Δt. The exhaust velocity S (k×Δt) depends on the opening degree θ. Thus, for obtaining the exhaust velocity S(k×Δt) until a lapse of t seconds after the current point, the planned opening degree value until a lapse of t seconds after the current point is necessary. In the present embodiment, the opening degree when the pressure value reaches the target pressure value Ps is calculated as the target opening degree estimation value θse. In the opening degree changing process from the current opening degree value to the target opening degree estimation value θse, the planned opening degree value to be temporarily set for next t seconds is planned in every Δt seconds according to a motor drive velocity identified in advance.

First, the flow rate estimation value Qine(current) is divided by the target pressure value Ps, and in this manner, an exhaust velocity estimation value Sse (=Qine(current)/Ps) as a rough exhaust velocity when the target pressure value Ps is brought is calculated. In description above, it is assumed that even when the pressure reaches the target pressure value, the flow rate value does not much change from the current flow rate estimation value.

Further, the opening degree is extracted with reference to the previous flow rate estimation value Qine(previous) before the current point, the exhaust velocity estimation value Sse, and the exhaust velocity map S(Qin, θ), and is taken as the target opening degree estimation value θse. Note that in a case where S is provided by a function expression, θ (=θse) is obtained by reverse calculation of Sse=S(Qine(previous), θ)

(Computing of Predictive Pressure Estimation Value Pp at t Seconds Later)

In the opening degree changing process from the measured current opening degree value θr to the target opening degree estimation value θse, the planned opening degree value to be temporarily set for next t seconds is, as described above, planned in every Δt seconds according to the motor drive velocity identified in advance. As a result, the planned opening degree value is determined in every Δt seconds until a lapse of t seconds after the current point. The exhaust velocity is extracted using this planned opening degree value, the above-described flow rate estimation value for next t seconds, and the above-described exhaust velocity map S(Qin, θ), and in this manner, the exhaust velocity S(k×Δt) for next t seconds can be obtained in every Δt seconds. The flow rate estimation value Qine and the exhaust velocity S(k×Δt) obtained in every Δt seconds are substituted into Expressions (6), (7). In this manner, the predictive pressure estimation value is obtained in every Δt seconds sequentially from the current point, and eventually, the predictive pressure estimation value Pp at t seconds later is obtained.

Generally, in pressure control, at least the substantially same order as a drive time required for merely swinging a valve body from the fully-closed position to the fully-open position is necessary as such a time that the pressure value can substantially reach the target pressure value. Meanwhile, Expressions (6), (7) obtained by discretization of Expression (5) do not show mere linear extrapolation with respect to the pressure. For this reason, prediction for a relatively-long subsequent time which is the substantially same as the drive time required for swinging the valve body from the fully-closed position to the fully-open position is available. That is, sufficient prediction for the substantially same time as the time required for causing the pressure to reach the target pressure value is available.

[Description of Opening Degree Adjustment Logic]

Next, an opening degree adjustment logic in the opening degree adjustment operation of FIG. 3 will be described in detail.

(1. Control Mode Determination)

First, the determination processing of the step S3 of FIG. 3 will be described. In the determination processing of the step S3, the control mode for opening degree adjustment is determined based on the current pressure value Pr, the current opening degree value θr, the target pressure value Ps, and the target opening degree estimation value θse.

Figure 4B:
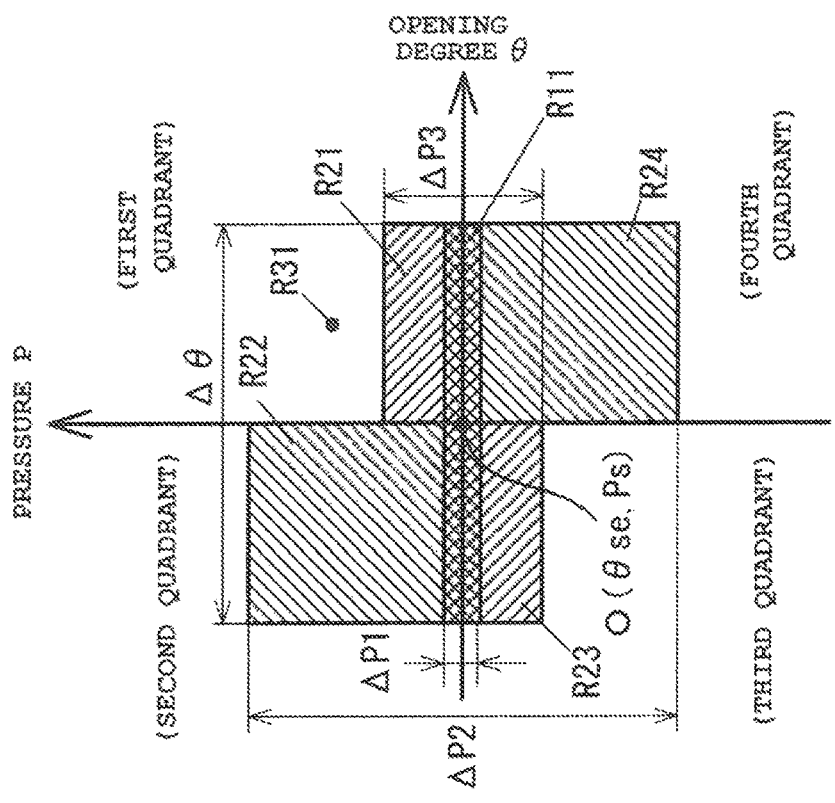
FIGS. 4A and 4B are graphs for describing control mode determination.
Figure 4A:
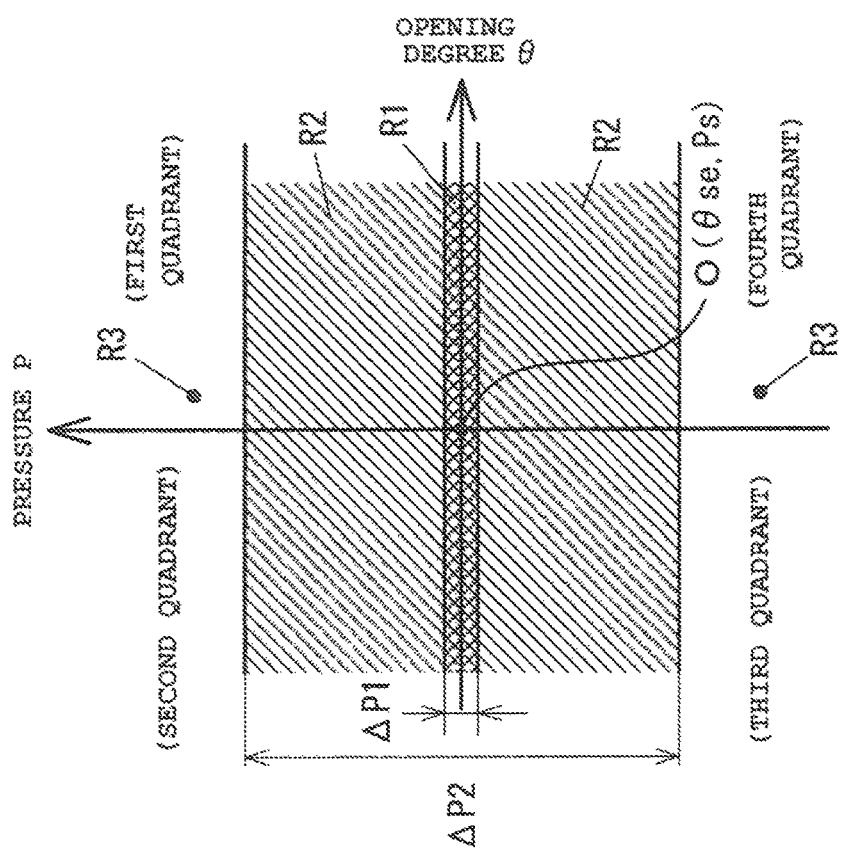

FIGS. 4A and 4B are graphs for describing control mode determination. The control mode is determined depending on a region where a point (θr, Pr) (hereinafter referred to as a "coordinate point") of the current opening degree value θr and the current pressure value Pr is positioned in an (opening degree, pressure) coordinate system with a coordinate origin O which is such a point (θse, Ps) that the opening degree value is the target opening degree estimation value θse and the pressure value is the target pressure value Ps as illustrated in FIGS. 4A and 4B. In a case where the control of FIG. 3 is started to initially execute the processing of the step S3, the control mode is determined based on FIG. 4A.

In FIG. 4A, a region R1 where a pressure range is Ps−ΔP1/2≤P≤Ps+ΔP1/2 is a dead zone control region, a region R2 where the pressure range is Ps−ΔP1/2>P≥Ps−ΔP2/2 and Ps+ΔP1/2<P≤Ps+ΔP2/2 is a close control region, and a region R3 where the pressure range is P<Ps−ΔP2/2 and P>Ps+ΔP2/2 is an open control region.

In a case where the coordinate point (θr, Pr) is included in the open control region R3, the opening degree is adjusted by the later-described open control. In a case where the coordinate point (θr, Pr) is included in the close control region R2, the opening degree is adjusted by the later-described close control. Moreover, in a case where the coordinate point (θr, Pr) is included in the dead zone control region R1, the opening degree is maintained without change. The dead zone control region R1 is a pressure region where the current pressure value Pr is regarded as the substantially target pressure value Ps, and the pressure range ΔP1 of the dead zone control region R1 is set to about one-hundredth (1%) of the target pressure value Ps, for example. Moreover, ΔP2 is set to several to a hundred times as large as the pressure range ΔP1 of the dead zone control region R1.

After the control of FIG. 3 has started, the processing from the step S2 to the step S6 is repeatedly executed. At this point, in a case where it is determined as the open control in the initial processing of the step S3, determination is performed using FIG. 4B in the second processing of the step S3. On the other hand, in a case where it is determined as the close control or the dead zone control in the initial processing of the step S3, determination is performed using FIG. 4A in the second processing of the step S3. Then, when it is determined as the open control in the second processing of the step S3, determination is performed using FIG. 4B in the third processing of the step S3. Similarly, FIG. 4A is used in next determination of the step S3 after determination as the close control or the dead zone control, and FIG. 4B is used in next determination of the step S3 after determination as the open control.

In FIG. 4B, a region R11 is a dead zone control region, regions R21 to R24 are close control regions, and a non-hatched region R31 is an open control region. An opening degree range in the dead zone control region R11 is θse−Δθ/2≤θ≤θse+Δθ/2. The opening degree range in the close control regions R21, R24 is θse≤θ≤θse+Δθ/2. The opening degree range in the close control regions R22, R23 is θse−Δθ/2≤θ<θse. In this example, Δθ is set to about ⅒ times as large as θse.

Moreover, the pressure range in the close control region R21 is Ps+ΔP1/2<P≤Ps+ΔP3/2, and the pressure range in the close control region R23 is Ps−ΔP3/2≤P<Ps−ΔP1/2. The pressure range in the close control region R22 is Ps+ΔP1/2<P≤Ps+ΔP2/2, and the pressure range in the close control region R24 is Ps−ΔP2/2≤P<Ps−ΔP1/2. In this example, ΔP3 is set smaller than ΔP2, and is set to about once to several times as large as the pressure range ΔP1 of the dead zone control region R1.

As described above, in the processing of the step S3 after determination as the open control in previous determination of the step S3, determination is performed using FIG. 4B. In a case where the coordinate point (θr, Pr) is included in the close control regions R21 to R24, the opening degree is adjusted by the later-described close control. In a case where the coordinate point (θr, Pr) is included in the dead zone control region R11, the opening degree is maintained at a current state without change. Then, in a case where it is determined as the close control or the dead zone control, determination is performed using FIG. 4A in next determination processing of the step S3.

On the other hand, in a case where the coordinate point (θr, Pr) is included in the open control region R31, the opening degree is adjusted by the later-described open control. Then, determination is again performed using FIG. 4B in the next determination processing of the step S3. For processing after such next determination processing, FIG. 4B is used while it is determined as the open control, and FIG. 4A is used at the next step S3 after it is determined as the close control or the dead zone control.

(2. Close Control)

Figure 5:
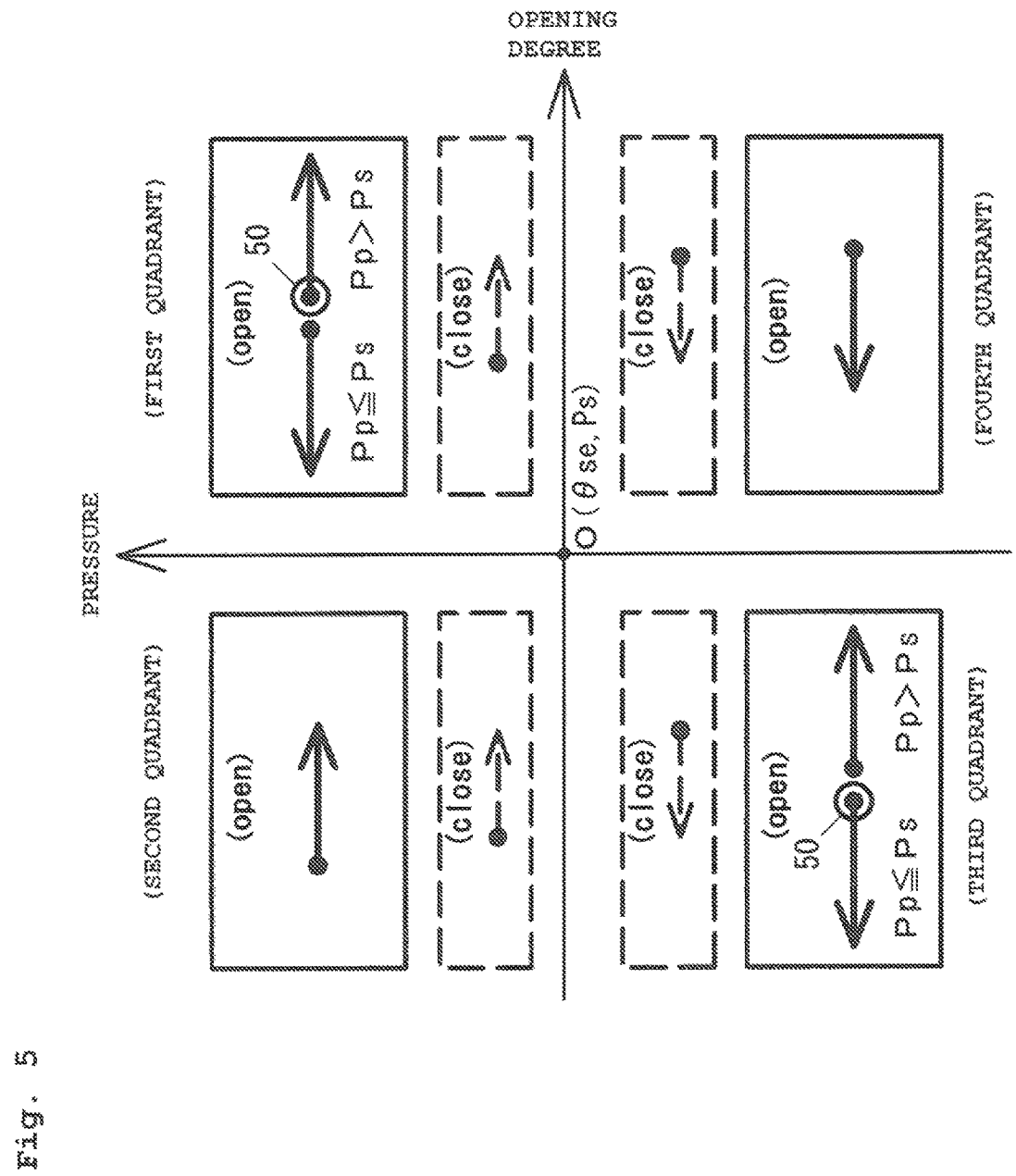
FIG. 5 is a graph for describing an example of the opening degree adjustment operation in open control and close control.

FIG. 5 is a graph for describing an example of the opening degree adjustment operation in the open control and the close control. In a case where the coordinate point (θr, Pr) is included in the close control region R2 of FIG. 4A or the close control regions R21 to R24 of FIG. 4B, the opening degree is adjusted in a direction indicated by an arrow in a dashed rectangular frame described as "(close)" in FIG. 5. In the close control, in a case where the current pressure value Pr is greater than the target pressure value Ps, the opening degree is adjusted in the direction of increasing the opening degree. That is, in a case where (Current Pressure Value Pr)>(Target Pressure Value Ps) is satisfied and the coordinate point (θr, Pr) is in a first quadrant and a second quadrant above the horizontal axis, the opening degree is adjusted such that the pressure decreases. Conversely, in a case where (Current Pressure Value Pr)<(Target Pressure Value Ps) is satisfied and the coordinate point (θr, Pr) is in a third quadrant and a fourth quadrant below the horizontal axis, the opening degree is adjusted in the direction of decreasing the opening degree such that the pressure increases.

(3. Open Control)

In the case of the above-described close control, the opening degree is increased in a case where the current pressure value Pr is merely greater than the target pressure value Ps, and is decreased in a case where the current pressure value Pr is merely smaller than the target pressure value Ps. On the other hand, in the case of the open control, the opening degree is adjusted based on the predictive pressure estimation value Pp and the target pressure value Ps. For the second and fourth quadrants, opening degree adjustment in this case is similar to that in the case of the close control. However, for the first and third quadrants, opening degree adjustment is different from that in the case of the close control.

In a case where the coordinate point (θr, Pr) is in the second quadrant, the opening degree is adjusted in the direction of increasing the opening degree. In this case, the current pressure value Pr decreases in the direction of the target pressure value Ps as the opening degree increases in the direction of the target opening degree estimation value θse. In a case where the coordinate point (θr, Pr) is in the fourth quadrant, the opening degree is adjusted in the direction of decreasing the opening degree. In this case, the current pressure value Pr increases in the direction of the target pressure value Ps as the opening degree decreases in the direction of the target opening degree estimation value θse.

In the case of the first quadrant, the direction of opening degree adjustment is set according to a magnitude relationship between the predictive pressure estimation value Pp and the target pressure value Ps. In this case, when the predictive pressure estimation value Pp deviates to be greater than the target pressure value Ps, such as Pp>Ps, the opening degree is adjusted in the direction (a direction indicated by a right-pointing arrow) of increasing the opening degree, or the opening degree value is maintained as it is as indicated by a circle 50. Conversely, when Pp≤Ps is satisfied such that the predictive pressure estimation value Pp is substantially equal to the target pressure value Ps or deviates to be smaller than the target pressure value Ps, the opening degree is adjusted in the direction (a direction indicated by a left-pointing arrow) of decreasing the opening degree. In the case of the third quadrant, the direction of opening degree adjustment is set according to the magnitude relationship between the predictive pressure estimation value Pp and the target pressure value Ps. In this case, when the predictive pressure estimation value Pp deviates to be greater than the target pressure value Ps, such as Pp>Ps, the opening degree is adjusted in the direction (the direction indicated by the right-pointing arrow) of increasing the opening degree. Conversely, when Pp≤Ps is satisfied such that the predictive pressure estimation value Pp is substantially equal to the target pressure value Ps or deviates to be smaller than the target pressure value Ps, the opening degree is adjusted in the direction (the direction indicated by the left-pointing arrow) of decreasing the opening degree, or the opening degree value is maintained as it is as indicated by the circle 50.

As described above, in the present embodiment, the opening degree is adjusted by the open control based on the predictive pressure estimation value Pp and the target pressure value Ps until the pressure value in the vacuum chamber 3 reaches the region (the region R2 of FIG. 4A or the regions R21 to R24 of FIG. 4B) close to the target pressure value Ps. When the pressure value reaches within the region close to the target pressure value Ps, the typical close control is performed. As a result, even in a case where the pressure value upon the start of opening degree adjustment and the target pressure value Ps greatly deviate from each other, the chamber inner pressure can be promptly changed to the vicinity of the target pressure value Ps, and the time taken for bringing the target pressure value Ps can be shortened.

Figure 6A:
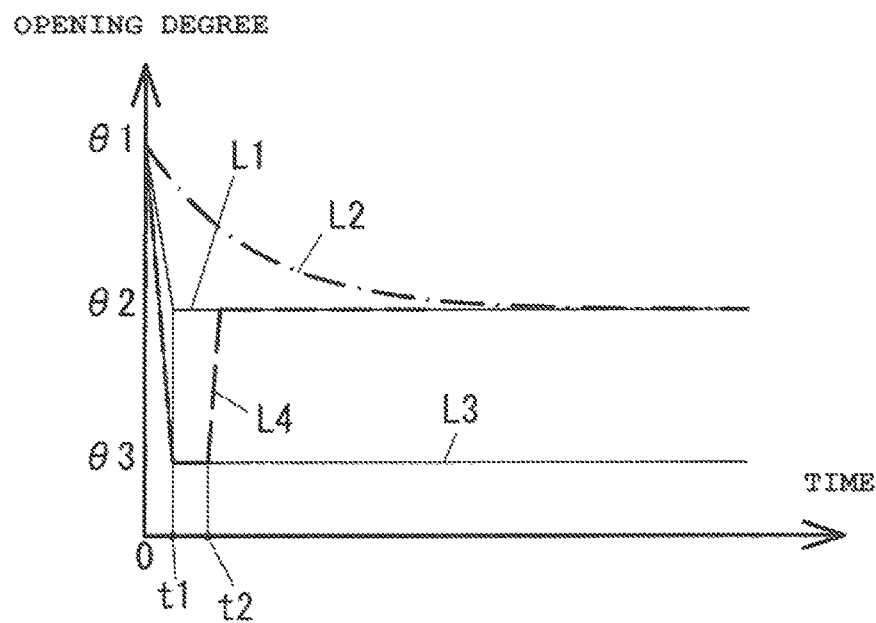
FIGS. 6A and 6B are graphs for qualitatively describing characteristics in opening degree adjustment in the present embodiment.
Figure 6B:
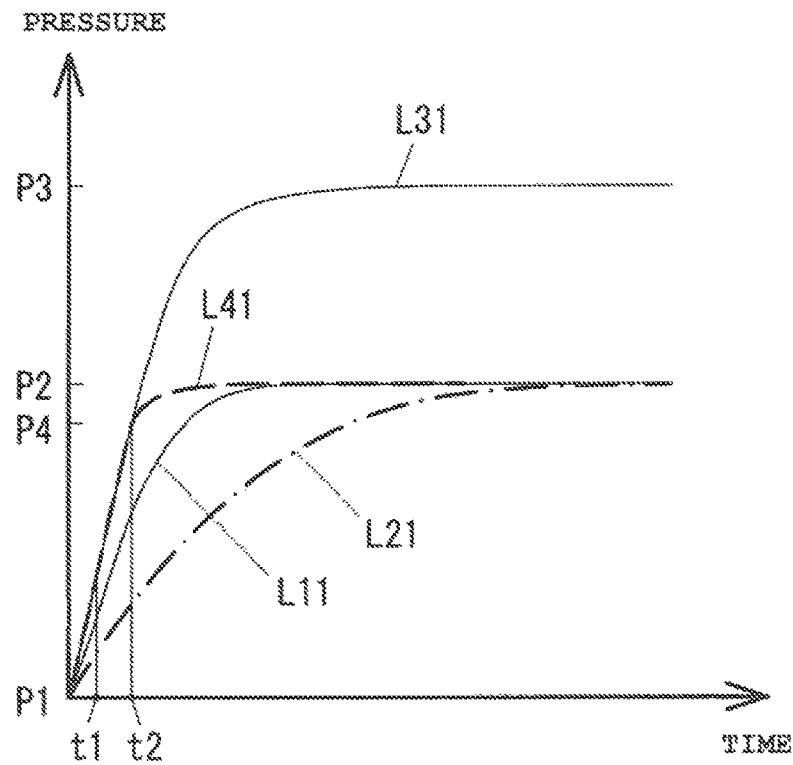

FIGS. 6A and 6B are graphs for qualitatively describing characteristics in opening degree adjustment in the present embodiment. For the sake of simplicity of description, a case where the introduced gas flow rate is a constant value without change and the valve body opening degree is adjusted to change the chamber inner pressure from P1 to P2 will be described. FIG. 6A illustrates a change in the opening degree, and FIG. 6B illustrates a change in the pressure. The opening degree at the pressure P1 is θ1, and the opening degree at the pressure P2 is θ2.

A line L1 of FIG. 6A shows a case where the opening degree is changed from θ1 to θ2 between a time point t of 0 to a time point t1. A line L11 of FIG. 6B shows a change in the pressure in a case where the opening degree is changed as in the line L1. Even in a case where the opening degree is changed from θ1 to θ2 within a short time, the chamber inner pressure cannot promptly change from the pressure P1 to the pressure P2, and a certain amount of time is required until the pressure reaches the pressure P2. Note that in a typical case where the pressure is changed from the pressure P1 to the pressure P2 by the close control, the opening degree is adjusted based on a difference between the chamber inner pressure and the target pressure P2, and therefore, the opening degree more gently changes as indicated by a chain line L2 as compared to the case of the line L1. Thus, a pressure line L21 also more gently increases as compared to the line L11.

A pressure P3 in FIG. 6B is a pressure in a case where the opening degree is changed to an opening degree θ3 greater than the opening degree θ2. In a case where the opening degree is changed from θ1 to θ3 between a time point t of 0 to the time point t1 as indicated by a line L3 of FIG. 6A, the pressure changes as in a line L31 of FIG. 6B. Regarding a change in the pressure until a time point t2, such a change is greater in the line L31 than in the line L11. Thus, the opening degree is changed as in a dashed line L4 of FIG. 6A so that the chamber inner pressure can reach the pressure P2 faster as in a line L41 of FIG. 6B. The line L4 shows that the opening degree is decreased to θ2 after the opening degree has been changed from θ1 to θ3 between a time point t of 0 to the time point t1 and has been maintained at the opening degree θ3 between the time point t1 to the time point t2. As a result, the chamber inner pressure gently changes from a pressure P4 to the pressure P2 after having rapidly increased to the pressure P4.

In the present embodiment, the opening degree is adjusted according to the control logic including the open control as illustrated in FIGS. 4A, 4B, and 5, and in this manner, is adjusted as shown by the line L4 of FIG. 6A. Thus, the chamber inner pressure can promptly reach the desired target pressure P2 as in the line L41 of FIG. 6B.

Note that for the sake of simplicity of description, the predictive pressure estimation value Pp is, as the planned opening degree value, computed with such a temporary setting that a current opening degree position is maintained until a lapse of t seconds after the current point as the reference point (details of computing will not be described). The above-described setting for maintaining the current opening degree position is specifically effective for a valve with a high valve body drive velocity. This is because the valve body can be actually and sufficiently driven from the current opening degree position to an opening degree position with the target opening degree estimation value after a lapse of t seconds as predicted.

Figure 7:
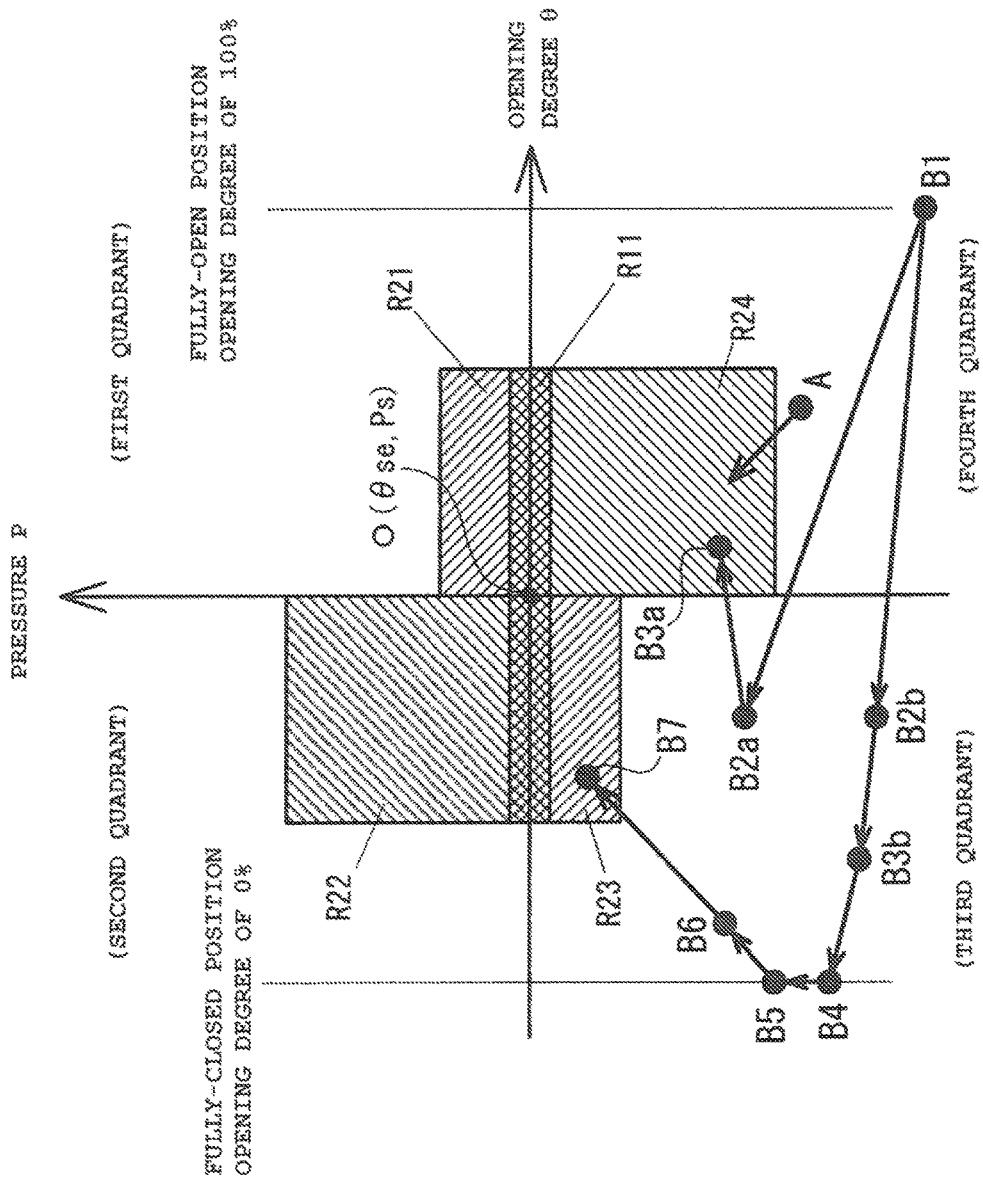
FIG. 7 is a graph for describing details of determination operation illustrated in FIG. 4B.

Generally, the current pressure value Pr upon the start of opening degree adjustment greatly deviates from the target pressure value Ps. Regarding the opening degree, the current opening degree value θr also greatly deviates, in many cases, from the target opening degree estimation value θse. Thus, the coordinate point (θr, Pr) upon the start of opening degree adjustment is included in the open control region R3 in the second or fourth quadrant of FIG. 4A. For example, in the case of a coordinate point A(θr, Pr) positioned close to the close control region R24 in the fourth quadrant as illustrated in FIG. 7, when the opening degree is adjusted in the direction of decreasing the opening degree by the open control as illustrated in FIG. 5, the position of the coordinate point (θr, Pr) moves into the close control region R24. Thereafter, as long as the coordinate point (θr, Pr) does not move from the close control region R24 to the open control region R31, the pressure is increased in the direction of the target pressure value Ps by the close control.

In the case of a coordinate point B1 (θr, Pr) apart from the close control region R24, when the opening degree is adjusted in the direction of decreasing the opening degree by the open control, the coordinate point (θr, Pr) moves to the open control region R31 in the third quadrant. For example, by the open control in the fourth quadrant as illustrated in FIG. 5, the coordinate point (θr, Pr) moves to a position such as a coordinate point B2a (θr, Pr) or a coordinate point B2b (θr, Pr).

A case where the coordinate point (θr, Pr) has moved to the coordinate point B2a (θr, Pr) is the following case: the pressure is relatively close to the target pressure value, and a pressure rise rate is high; and therefore, Pp>Ps is satisfied, and the opening degree is next adjusted in the direction of increasing the opening degree. Thus, the pressure rise rate decreases while the coordinate point (θr, Pr) is moving in the direction of the target opening degree estimation value θse. In this case, a coordinate point B3a (θr, Pr) is included in the close control region R24 in the fourth quadrant. As long as the coordinate point (θr, Pr) does not move from the close control region R24 to the open control region R31, the pressure reaches the target pressure value Ps by the close control.

In a case where the coordinate point (θr, Pr) has moved to the coordinate point B2b (θr, Pr), the pressure is far away from the target pressure value, and the pressure rise rate is low. Thus, Pp≤Ps is satisfied, and the opening degree is next adjusted in the direction of decreasing the opening degree. In this case, adjustment for decreasing the opening degree by the open control is further performed several times until a relationship of Pp≤Ps is inversed to a relationship of Pp>Ps after a coordinate point B3b (θr, Pr). In the process, when the fully-closed position as the opening degree lower limit is brought, the opening degree cannot be decreased any further. Thus, a position with an opening degree of 0% is maintained (a point B4). In this case, an opening degree of 0% is maintained while Pp≤Ps is continuously satisfied. When the pressure gradually increases and Pp≤Ps is changed to Pp>Ps (a point B5), an adjustment direction is changed to the direction of increasing the opening degree. The pressure rise rate is decreased in the process of increasing the opening degree by the open control (a point B6), and eventually, the coordinate point (θr, Pr) moves to the close control region R23 in the third quadrant (a point B7). From this point, the pressure approaches the target pressure value Ps by the close control in the third or fourth quadrant. As described above, the current opening degree value θr and the current pressure value Pr at each of the points B1, B2b, B3b, B4, B5, B6, and B7 illustrated in this order in FIG. 7 form points (not shown) on the curves L4, L41 of FIGS. 6A and 6B. Note that FIG. 7 illustrates a case where the point B4 indicates the opening degree lower limit (the position with an opening degree of 0%), but an opening degree value greater than 0% may be maintained as in θ3 of FIGS. 6A and 6B.

Second Embodiment

Figure 8:
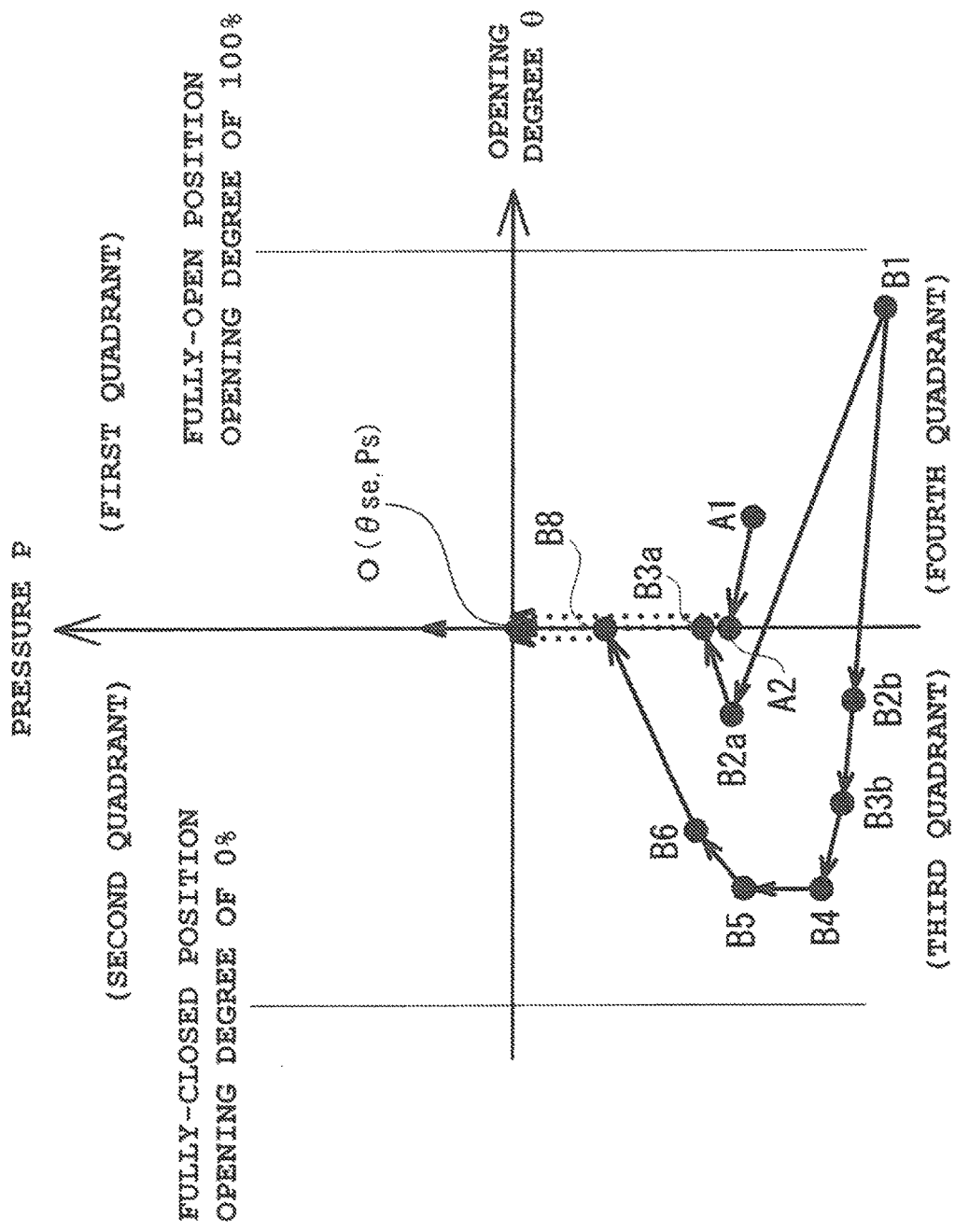
FIG. 8 is a graph of a trajectory of a coordinate point in a second embodiment.
Figure 9:
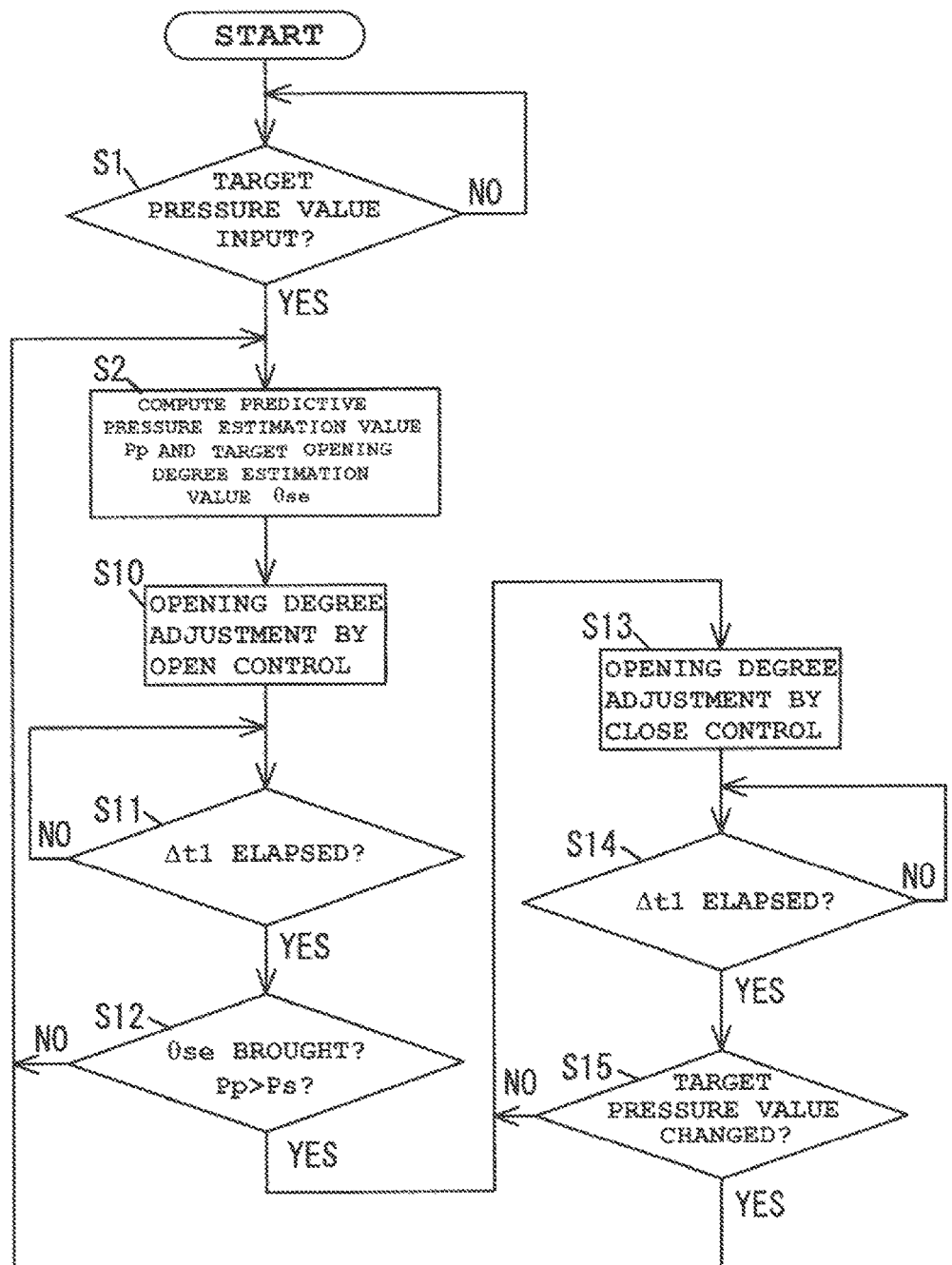
FIG. 9 is a flowchart of opening degree adjustment operation in the second embodiment.

FIGS. 8 and 9 are a graph and a flowchart for describing a second embodiment of the present invention. In the above-described first embodiment, the dead zone control region R1, the close control region R2, and the open control region R3 are, as illustrated in FIGS. 4A and 4B, set in the (opening degree, pressure) coordinate system with the point (θr, Ps) as the coordinate origin O, and the control mode is selected depending on the region including the coordinate point (θr, Pr) On the other hand, in the second embodiment, the above-described regions R1 to R3 are not set in a (θr, Pr) coordinate system as illustrated in FIG. 8, and open control is switched to close control to adjust a pressure when a current opening degree value θr reaches a target opening degree estimation value θse by the open control.

In FIG. 8, in a case where opening degree adjustment starts from a coordinate point B1 (θr, Pr) in a fourth quadrant, an opening degree is adjusted in the direction of decreasing the opening degree by the open control, and the coordinate point (θr, Pr) moves to a coordinate point B2a (θr, Pr) in a third quadrant, for example. In a case where the coordinate point (θr, Pr) has moved to the coordinate point B2a (θr, Pr), the pressure is relatively close to the target pressure value, and a pressure rise rate is high. Thus, a predictive pressure estimation value Pp after a lapse of t seconds as calculated with reference to the coordinate point B2a (θr, Pr) as a reference point satisfies Pp>Ps. Consequently, the opening degree is, from the coordinate point B2a (θr, Pr), adjusted in the direction of increasing the opening degree, and the pressure rise rate decreases while the coordinate point (θr, Pr) is moving in the direction of the target opening degree estimation value θse. When the opening degree Or at a destination B3a from the coordinate point B2a (θr, Pr) reaches the target opening degree estimation value θse, the open control ends and is switched to the close control.

In a case where the coordinate point (θr, Pr) moves from the coordinate point B1 (θr, Pr) to a coordinate point B2b (θr, Pr) in the third quadrant by the open control, the opening degree is adjusted in the direction of decreasing the opening degree or an opening degree value is maintained while the calculated predictive pressure estimation value Pp satisfies Pp≤Ps, as described with reference to FIG. 5. When Pp>Ps is satisfied, the opening degree is adjusted in the direction of increasing the opening degree. When the coordinate point (θr, Pr) moves to B2b, B3b, B4, B5, and B6 in this order by the above-described open control and the opening degree at a destination B8 reaches the target opening degree estimation value se, the open control ends and is switched to the close control. Although not shown in the figure, even in a case where the coordinate point (θr, Pr) upon the start of pressure adjustment (upon a change in the target pressure value) is in a first or second quadrant, a trajectory reaching the target opening degree estimation value θse as a reference opening degree is taken according to the logic of FIG. 5.

Note that in a case where opening degree adjustment starts from a position close to an opening degree axis, such as a coordinate point A1, adjustment in the direction of decreasing the opening degree starts from the coordinate point A1 according to the logic of FIG. 5. However, the predictive pressure estimation value Pp has been already brought into the state of Pp>Ps. Thus, the coordinate point (θr, Pr) does not enter the third quadrant, and the open control ends until a coordinate point A2 at a boundary (a pressure axis when the opening degree is the target opening degree estimation value θse) between the third and fourth quadrants. Although not shown in the figure, even in the case of the state of Pp≤Ps in the second quadrant, the open control similarly ends until a boundary between the first and second quadrants. The end of the open control means, as supplementary note, the start of the close control in a state in which an output opening degree by the open control is held constant.

A case of movement from A1 to A2 in FIG. 8 is a case where the opening degree is decreased at a proper drive velocity. In this case, if the opening degree is decreased at an extremely-low drive velocity, the fourth quadrant is positioned at the right of the target opening degree estimation value θse, and therefore, there is a probability that the pressure is slow to reach the target pressure value Ps. In preparation for this rare case, when it is determined that a signal of the predictive pressure estimation value Pp is, for example, equal to or smaller than the target pressure value Ps and has a local maximum value (i.e., a signal with a substantially zero pressure rise), the drive velocity is promptly increased such that the opening degree reaches the target opening degree estimation value (the pressure axis). This avoids lowering of responsiveness. Even a rare case in the second quadrant may be similarly handled. That is, in a case where it is determined that the signal of the predictive pressure estimation value Pp is equal to or greater than the target pressure value Ps and has a local minimum value (i.e., a signal with a substantially zero pressure decrease), the drive velocity is promptly increased such that the opening degree reaches the target opening degree estimation value (the pressure axis).

In the second embodiment, the flowchart described with reference to FIG. 3 in the first embodiment is changed to that of FIG. 9, for example. In FIG. 9, steps S1, S2 are processing similar to that of the steps S1, S2 of FIG. 3. That is, when it is, at the step S1, determined that the target pressure value Ps is input and the processing proceeds to the step S2, the target opening degree estimation value θse and the predictive pressure estimation value Pp are calculated at the step S2. The subsequent processing of the step S10 is similar to that of the step S4 of FIG. 3, and the opening degree is adjusted by the open control. Opening degree adjustment by the open control is similar to that in the case of the first embodiment, and the direction of opening degree adjustment is determined based on FIG. 5.

At a step S11, it is determined whether or not a predetermined time Δt1 has elapsed after the start of computing of the predictive pressure estimation value of the step S2. When it is determined that the predetermined time Δt1 has elapsed, the processing proceeds to a subsequent step S12. At the step S12, it is determined whether or not the opening degree (the current opening degree value θr) at the destination reaches the target opening degree estimation value θse and the predictive pressure estimation value Pp satisfies Pp>Ps. At the step S12, when it is determined that both conditions are satisfied (Yes), the processing proceeds to a step S13. When either one of the conditions is not satisfied (No), the processing returns to the step S2. For example, in a case where the coordinate point (θr, Pr) has moved from the point B1 of FIG. 8 in the direction of the third quadrant and θr=θse is satisfied, Pp≤Ps is satisfied. Thus, the processing proceeds from the step S12 to the step S2. On the other hand, in a case where the coordinate point (θr, Pr) has moved from a point P6 to a point P8, θr=θse and Pp>Ps are satisfied. Thus, the processing proceeds from the step S12 to the step S13.

The processing of the step S13 is similar to that of the step S4 of FIG. 3, and the opening degree is adjusted by the close control. At a step S14, it is determined whether or not the predetermined time Δt1 has elapsed from the start of the processing of the step S14 (i.e., the start of a change in the opening degree). When it is determined that the predetermined time $\Delta t1$ has elapsed, the processing proceeds to a step S15. At the step S15, it is determined whether or not the target pressure value Ps has been changed. In a case where the target pressure value Ps has been changed, the processing returns from the step S15 to the step S2, and the opening degree is adjusted again by the open control. On the other hand, in a case where the target pressure value Ps has not been changed, the processing returns to the step S13 to continue the close control.

When opening degree adjustment starts from the coordinate point B1 illustrated in FIG. 8, the processing from the step S2 to the step S12 of FIG. 9 is repeated such that the coordinate point ($\theta$r, Pr) moves to B1, B2$b$, B3$b$, B4, B5, B6, and B8 in this order. When the coordinate point ($\theta$r, Pr) moves to the coordinate point B8, it is, at the step S12 of FIG. 9, determined that the current opening degree value $\theta$r reaches the target opening degree estimation value $\theta$se, and the processing proceeds from the step S12 to the step S13. Subsequently, opening degree adjustment by the close control is repeated in the order of the step S13, the step S14, the step S15, the step S13, . . . , and the coordinate point ($\theta$r, Pr) reaches the coordinate origin ($\theta$se, Ps). It is ideal that the coordinate point ($\theta$r, Pr) reaches the target coordinate origin ($\theta$se, Ps) after having passed on the pressure axis. However, even in a case where there is an estimation error in the target opening degree estimation value $\theta$se, the coordinate point ($\theta$r, Pr) reaches the coordinate origin ($\theta$se, Ps) after having passed in the vicinity of the pressure axis.

In the above-described first embodiment, the open control region R31 and the close control regions R21 to R24 are, for example, set as in FIG. 4B, and for this reason, a specific threshold needs to be determined. On the other hand, these regions are not set in the second embodiment, and the close control is performed after the opening degree has been changed to the reference opening degree (i.e., the target opening degree estimation value $\theta$se) by the open control. Thus, the second embodiment is preferable in terms of practical versatility.

(Variation)

In the above-described second embodiment, even after $\theta$r=$\theta$se and Pr=Ps have been satisfied, such a state is maintained by the close control. Thereafter, when the target pressure value Ps is changed, the processing proceeds to the step S2 by the processing of the step S15 of FIG. 9, and the open control starts under a new condition (the target pressure value Ps). Even in a case where the target pressure value Ps is not changed, when environment conditions such as a gas introduction amount and plasma ON/OFF are changed, the coordinate point ($\theta$r, Pr) indicating the current state shifts from the coordinate origin.

Figure 10A:
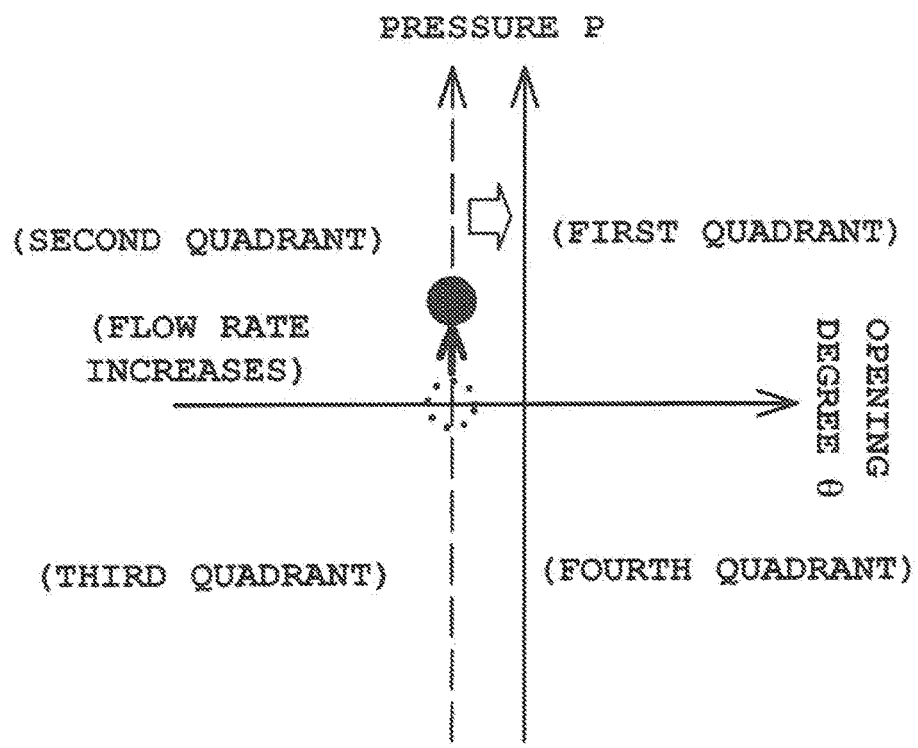
FIGS. 10A and 10B are graphs for describing movement of a coordinate point ($\theta r$, $Pr$) due to a change in an introduced gas flow rate.
Figure 10B:
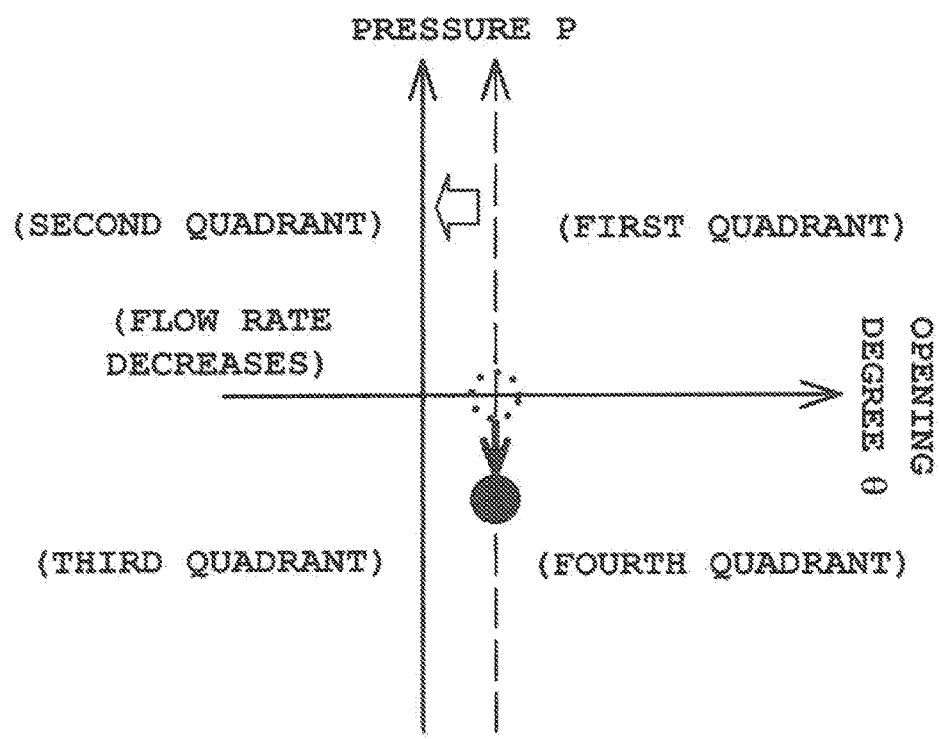

FIGS. 10A and 10B are graphs for describing movement of the coordinate point ($\theta$r, Pr) due to a change in the flow rate of introduced gas. FIG. 10A illustrates a case where the introduced gas flow rate has been increased. A circle indicated by a dashed line is the coordinate point ($\theta$r, Pr) before an increase in the flow rate, and a black circle is the coordinate point ($\theta$r, Pr) after an increase in the flow rate. When the introduced gas flow rate increases, the measured current pressure value Pr increases beyond the target pressure value Ps. Thus, the black circle indicating the coordinate point ($\theta$r, Pr) moves, as viewed in the figure, upward from an opening degree axis (the horizontal axis) as indicated by an arrow. Moreover, an increase in the flow rate Qin results in an increase in the target opening degree estimation value $\theta$se calculated based on such a flow rate. Thus, a pressure axis (the vertical axis) moves, as viewed in the figure, to the right as indicated by a white arrow. As a result, the coordinate point ($\theta$r, Pr) moves to the second quadrant.

On the other hand, FIG. 10B illustrates a case where the introduced gas flow rate has been decreased. When the introduced gas flow rate decreases, the measured current pressure value Pr decreases. Thus, the coordinate point ($\theta$r, Pr) indicated by the black circle moves, as viewed in the figure, downward from the opening degree axis (the horizontal axis) as indicated by an arrow. Moreover, a decrease in the flow rate Qin results in a decrease in the calculated target opening degree estimation value $\theta$se. Thus, the pressure axis (the vertical axis) moves, as viewed in the figure, to the left as indicated by a white arrow. As a result, the coordinate point ($\theta$r, Pr) indicating the current state moves to the fourth quadrant.

In the case of the above-described second embodiment, the processing from the step S13 to the step S15 of FIG. 9 is repeated after the coordinate point ($\theta$r, Pr) has reached the origin ($\theta$se, Ps). Thus, when the coordinate point ($\theta$r, Pr) moves to the second or fourth quadrant as in FIGS. 10A and 10B, the opening degree is adjusted by the close control. However, in the case of excessive pressure fluctuation, the coordinate point is greatly apart from the opening degree axis (the horizontal axis) For this reason, there is a probability that appropriate reaction cannot be provided by the close control due to poor responsiveness.

Figure 11A:
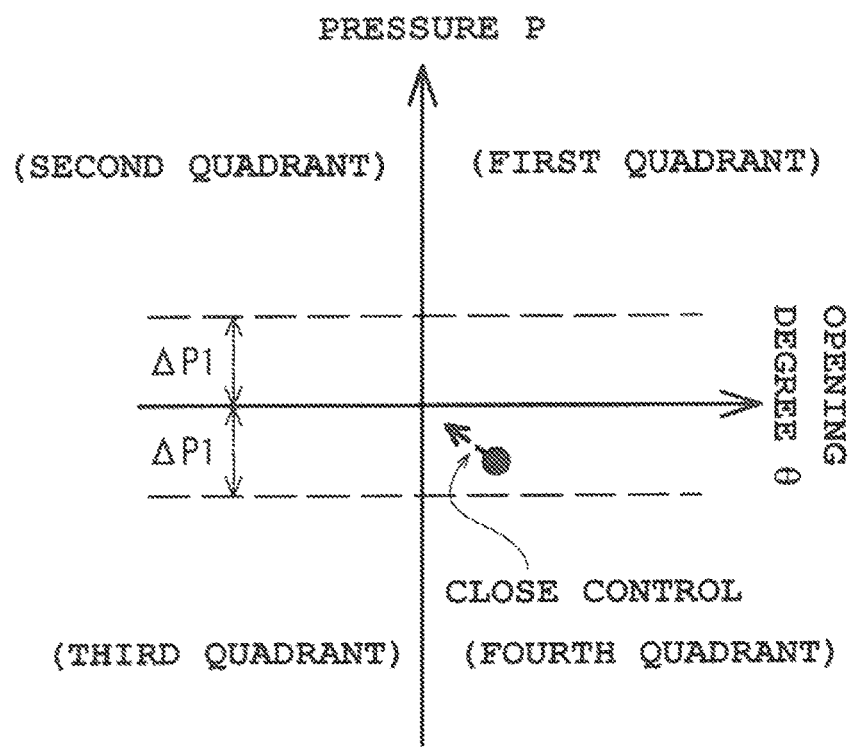
FIGS. 11A and 11B are graphs for describing control in coordinate point movement in a variation.

In the variation, the method for controlling opening degree adjustment varies according to the magnitude of a difference $\Delta P=|Pr-Ps|$ between the current pressure value Pr and the target pressure value Ps. When the coordinate point ($\theta$r, Pr) moves to the fourth quadrant due to a decrease in the gas introduction amount as illustrated in FIG. 11A, in a case where the difference $\Delta P$ as a pressure change satisfies $\Delta P \leq \Delta P1$ with respect to a preset threshold $\Delta P1$, the close control is continued, and the opening degree is adjusted such that the current pressure value Pr reaches the target pressure value Ps by the close control.

Figure 11B:
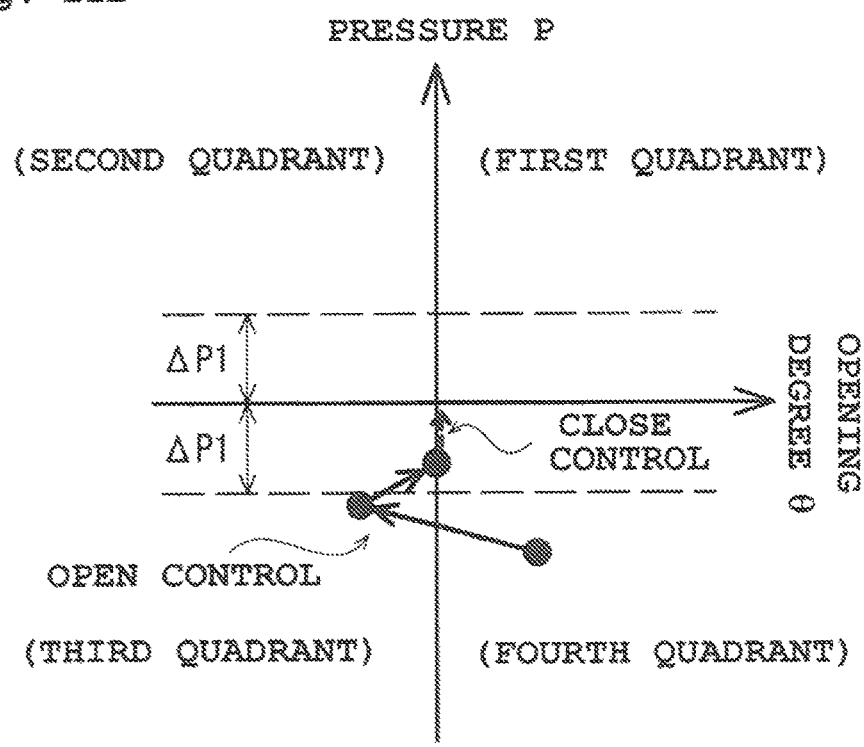

On the other hand, in the case of $\Delta P > \Delta P1$ as in FIG. 11B, opening degree adjustment is switched to that by the open control. As a result, opening degree adjustment starts by the open control as in the case of the above-described second embodiment. In a case where the opening degree $\theta$r reaches the target opening degree estimation value $\theta$se and the predictive pressure estimation value Pp satisfies Pp>Ps, the open control is switched to the close control. Thus, opening degree adjustment to the target pressure value Ps is performed by the close control. As a result, even in the case of excessive pressure fluctuation, the pressure can be promptly adjusted to the target pressure value Ps. Note that a measure of threshold $\Delta P1$ is about 10% of the target pressure value Ps.

Figure 12:
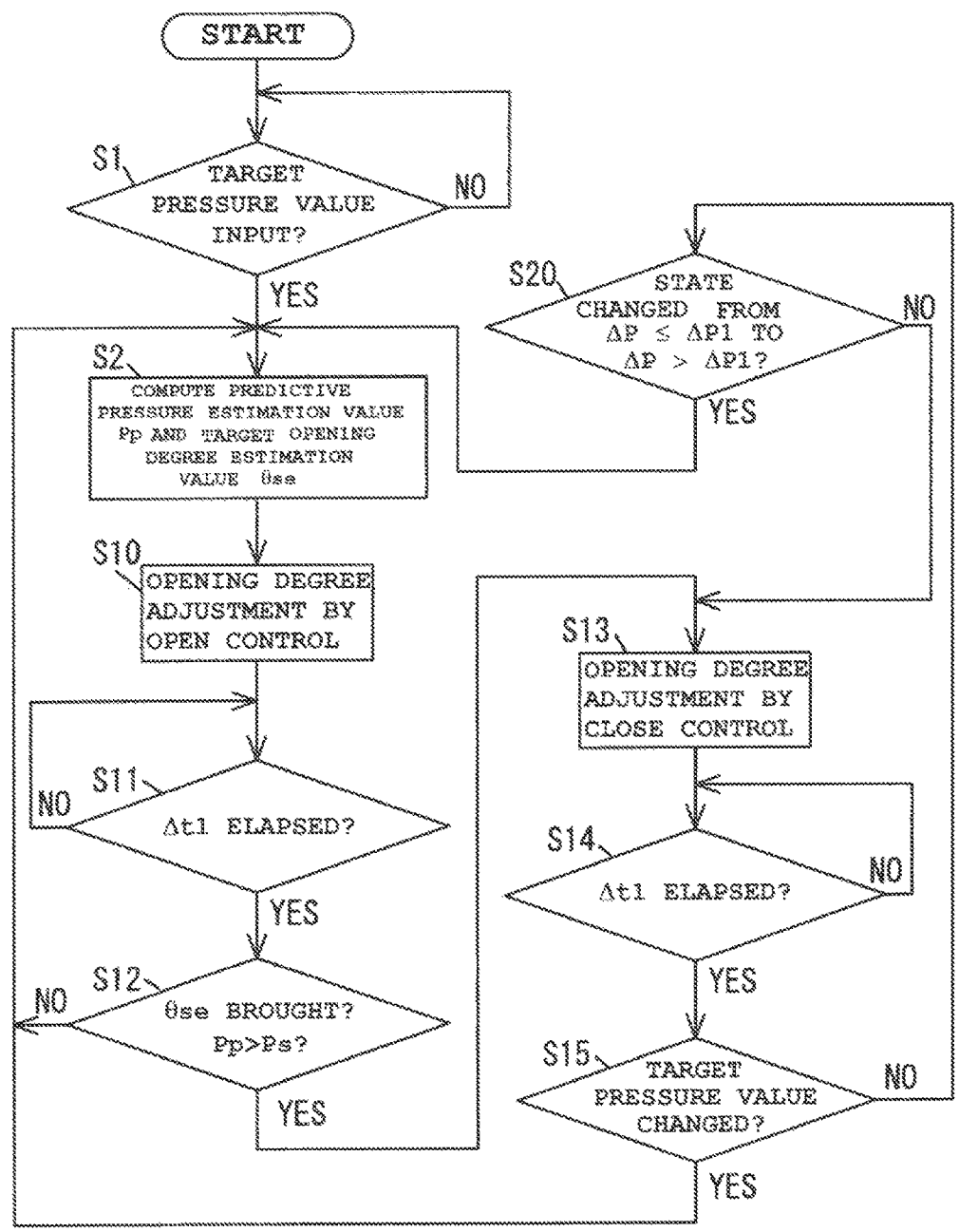
FIG. 12 is a flowchart of opening degree adjustment operation in the variation.

FIG. 12 illustrates an example of a control flow in the case of the variation. A step S20 is added to the flowchart described with reference to FIG. 9. At the step S20, it is determined, from the state of $\Delta P=|Pr-Ps| \leq \Delta P1$, whether or not the deviation $\Delta P$ exceeds $\Delta P1$, i.e., $\Delta P=|Pr-Ps|>\Delta P1$ is satisfied. In a case where it is determined that $\Delta P \leq \Delta P1$ is maintained or the state has changed from $\Delta P > \Delta P1$ to $\Delta P \leq \Delta P1$, the processing proceeds to the step S13 to continue the close control. On the other hand, in a case where it is determined that the state has changed from $\Delta P \leq \Delta P1$ to $\Delta P > \Delta P1$, the processing proceeds to the step S2 to switch the close control to the open control.

As in the case of the second embodiment, when it is determined as Yes at the step S12 and the processing proceeds to the step S13, the open control is switched to the close control, and the processing of the step S13, the step S14, and the step S15 is sequentially executed. When the target pressure value Ps is not changed, the processing proceeds from the step S15 to the step S20 to execute the determination processing of the step S20. For example, in a case where the gas flow rate is not increased/decreased, movement of the coordinate point as illustrated in FIGS. 10A and 10B does not occur. Thus, it is still determined as ΔP≤ΔP1, the processing proceeds from the step S20 to the step S13 to continue the close control. As described above, in a case where ΔP≤ΔP1 is, in the variation, changed to ΔP>ΔP1 due to, e.g., flow fluctuation while the close control is being continued, the processing proceeds to the step S2 to switch the close control to the open control. In a case where the target pressure value Ps has been changed, the processing proceeds from the step S15 to the step S2 to switch the close control to the open control.

Note that a case where the coordinate point (θr, Pr) has moved to the fourth quadrant has been described with reference to FIGS. 11A and 11B, but similar processing is also performed in a case where the coordinate point (θr, Pr) has moved to the second quadrant as in FIG. 10B.

(Description Regarding Error of Target Opening Degree Estimation Value θse)

The target opening degree estimation value θse at the coordinate origin O (θse, Ps) in FIGS. 4A, 4B, and 5 is calculated based on the flow rate estimation value Qine (current) as described above. Thus, in a case where the introduced gas flow rate does not change during operation for opening degree adjustment, the stable target opening degree estimation value θse is calculated. However, the flow rate Qin of gas introduced into the vacuum chamber 3 actually changes, and for this reason, a computing result of the target opening degree estimation value θse varies in every repeated computing. That is, the vertical axis of FIGS. 4A, 4B, and 5 shifts right to left within such a computing error range. In a case where the target opening degree estimation value θse changes as described above, the position of the coordinate point (θr, Pr) changes between a position in the third quadrant and a position in the fourth quadrant. The same applies to a case between the first and second quadrants. Thus, e.g., the average (the movement average) of the target opening degree estimation values θse is used as θse at the coordinate origin O (θse, Ps) so that shifting of the pressure coordinate axis (the vertical axis) can be reduced.

Instead of using the point (θse, Ps) based on the target opening degree estimation value θse and the target pressure value Ps as the coordinate origin O, a point (θs, Ps) based on a certain reference opening degree θs and the target pressure value Ps may be used as the coordinate origin O. For example, in a case where an opening degree in use with the target pressure value Ps is known, such an opening degree may be used as the reference opening degree θs. In a specific example, in a case where the introduced gas flow rate value is input from the device controller to the valve controller, the introduced gas flow rate is a known rate (the introduced gas flow rate input value), and therefore, estimation is not necessary. Thus, θs is a constant value as long as the settings for the target pressure value and the flow rate are not changed.

In a case where the target opening degree estimation value θse changes in every computing to greatly shift the vertical axis of FIGS. 4A, 4B, and 5 right to left, there is a probability that the current pressure value Pr does not converge to the target pressure value Ps. For this reason, the threshold Δθ of FIG. 4B may be set depending on the degree of shifting of the target opening degree estimation value θse.

For example, the movement average of the sequentially-calculated target opening degree estimation values θse is obtained, and is used as the opening degree θse at the coordinate origin O (θse, Ps). Further, the standard deviation of the target opening degree estimation value θse is calculated. Then, the threshold Δθ is increased as the standard deviation increases, and in this manner, the open control transitions to the close control at an earlier stage.

As described above, the current opening degree value θr from the encoder 130 configured to detect the opening degree of the valve plate 12 and the current pressure value Pr and the target pressure value Ps of the vacuum chamber 3 are input to the valve controller 2 forming a control section of the valve device. Based on the current pressure value Pr and the current opening degree value θr detected by the encoder 130, the valve controller 2 controls the opening degree of the valve plate 12 such that the current pressure value Pr approaches the target pressure value Ps. According to the current pressure value Pr and the current opening degree value θr detected by the encoder 130, the valve controller 2 performs either one of the open control for performing rough adjustment of the opening degree of the valve plate 12 or the close control for performing fine control of the opening degree of the valve plate 12.

In the open control, the predictive pressure estimation value Pp at the prediction target time which is t seconds later from the preset current point as the reference point is estimated, and rough adjustment is performed based on the predictive pressure estimation value Pp and the target pressure value Ps. As described above, rough adjustment is performed based on the estimated predictive pressure estimation value Pp and the target pressure value Ps so that the inner pressure of the vacuum chamber can be promptly changed to the vicinity of the target pressure value Ps.

Note that as illustrated in FIGS. 4A and 4B, the opening degree is preferably controlled in the open control and the close control based on a magnitude relationship between the reference opening degree (in FIGS. 4A and 4B, the target opening degree estimation value θse) for the target pressure value Ps and the current opening degree value θr and a magnitude relationship between the target pressure value Ps and the current pressure value Pr. With such control, the control for causing the current pressure value Pr to reach the target pressure value Ps can be reliably performed.

For example, as illustrated in FIG. 5, an opening degree/pressure coordinate plane represented by an opening degree coordinate and a pressure coordinate is divided into four regions of the first, second, third, and fourth quadrants by the pressure coordinate axis and the opening degree coordinate axis passing through the coordinate point represented by the reference opening degree and the target pressure value, and the opening degree control varies depending on whether the point represented by the current opening degree value θr and the current pressure value Pr is in the first, second, third, or fourth quadrant.

In a case where the coordinate point (θr, Pr) is in the first quadrant in the open control, when the predictive pressure estimation value Pp is equal to or greater than the target pressure value Ps, the opening degree of the valve plate 12 is preferably increased or held. When the predictive pressure estimation value Pp is smaller than the target pressure value Ps, the opening degree of the valve plate 12 is preferably decreased. In a case where the coordinate point (θr, Pr) is in the third quadrant, when the predictive pressure estimation value Pp is equal to or greater than the target pressure value Ps, the opening degree of the valve plate 12 is preferably increased. When the predictive pressure estimation value Pp is smaller than the target pressure value Ps, the opening degree of the valve plate 12 is preferably decreased or held. In a case where the coordinate point (θr, Pr) is in the second quadrant, the opening degree of the valve plate 12 is preferably increased. In a case where the coordinate point (θr, Pr) is in the fourth quadrant, the opening degree of the valve plate 12 is preferably decreased. With such control, even in a case where the coordinate point (θr, Pr) is in the first or third quadrant, the open control can reliably transition to the close control such that the inner pressure of the vacuum chamber reaches the target pressure value Ps.

Determination on whether the close control or the open control is performed in each quadrant is preferably made depending on whether or not the coordinate point (θr, Pr) is included in the region including the point represented by the reference opening degree (e.g., the target opening degree estimation value θse) and the target pressure value Ps and set by the predetermined opening degree threshold and the predetermined pressure threshold.

For example, in a case where a region set by the predetermined pressure threshold is taken as a predetermined pressure deviation range around the target pressure value Ps to switch the open control to the close control, the predetermined pressure deviation (ΔP3) in the first and third quadrants is preferably smaller than the predetermined pressure deviation (ΔP2) in the second and fourth quadrants as in FIG. 4B. With such a setting, the pressure can promptly and reliably converge to the target pressure value Ps from that in the first and third quadrants.

In a case where switching from the open control to the close control is, as illustrated in FIG. 4B, determined depending on whether or not the current opening degree value θr is in the predetermined opening degree range (±Δθ/2) around the target opening degree estimation value θse, it is preferably set such that a higher estimation accuracy of the target opening degree estimation value θse results in a smaller predetermined opening degree range (±Δθ/2). In the case of a great estimation error of the target opening degree estimation value θse, a great predetermined opening degree range (±Δθ/2) is set. Thus, the close control is early selected so that the pressure can more reliably converge to the target pressure value Ps.

The predictive pressure estimation value Pp is preferably computed in such a manner that the planned opening degree value indicating the temporarily-set process until the prediction target time in the opening degree changing process from the detected opening degree to the target opening degree estimation value and the introduced gas flow rate estimation value obtained according to the expression for exhausting, i.e., V×(dP/dt)+S×P=Qin, are applied to the relational expression obtained by discretization of the general solution of the expression for exhausting. By such computing, a higher-accuracy predictive pressure estimation value Pp can be estimated.

For the planned opening degree value, the degree of freedom in setting is high. In a simpler method for providing the planned opening degree value, the current detected opening degree value may be fixed, and the current estimation value of the introduced gas flow rate estimation value or the introduced gas flow rate input value may be fixed. Note that in a case where both of the detected opening degree and the introduced gas flow rate are fixed to the current values as described above, the idea of planning the opening degree is not necessary, and the detected opening degree and the introduced gas flow rate may be, during the prediction target time, fixed to compute the predictive pressure estimation value.

Note that description above has been made merely as an example, and a correspondence between description in the above-described embodiments and description in the claims is not limited and restricted when the present invention is interpreted. For example, the valve plate 12 slidably moves to change the opening degree in the above-described valve device, but the present invention is applicable to a valve device of such a type that an opening degree is changed to control a conductance.

Note that in an opening degree control pattern illustrated in FIG. 5, characteristic determination using the predictive pressure estimation value in the first and third quadrants is performed. However, the opening degree control pattern by the open control is not limited to that illustrated in FIG. 5. For example, an opening degree control pattern may be used such that the opening degree control in the third quadrant as illustrated in FIG. 5 is replaced with the control of decreasing the opening degree as in the case of the fourth quadrant, or an opening degree control pattern may be used such that the opening degree control in the first quadrant as illustrated in FIG. 5 is replaced with the control of decreasing the opening degree as in the case of the second quadrant. Moreover, in characteristic determination using the predictive pressure estimation value as described above, the prediction target time of the predictive pressure estimation value may be changed and set as necessary.

An example of proportional control (P control) for the deviation between the current pressure value and the target pressure value has been described regarding the close control, but typical proportional integral control (PI control) or typical proportional integral derivative control (PID control) may be employed. The predictive pressure estimation value used in the open control of the present invention may be, as the close control, applied instead of the derivative control of the close control.

What is claimed is:

1. A valve device provided between a vacuum chamber and a vacuum pump and configured to change an opening degree of a valve body to change a conductance, comprising:
   an opening degree detection section configured to detect the opening degree of the valve body; and
   a control section configured to control, based on a pressure value of the vacuum chamber and the opening degree detected by the opening degree detection section, the opening degree of the valve body such that the pressure value approaches a target pressure value, the pressure value and the target pressure value being input to the control section,
   wherein the control section performs, according to the pressure value and the opening degree detected by the opening degree detection unit, open control for performing rough adjustment of the opening degree of the valve body and close control for performing fine adjustment of the opening degree of the valve body,
   in the open control, a predictive pressure estimation value at a preset future prediction target time from a current point is estimated, and the rough adjustment is performed based on the predictive pressure estimation value and the target pressure value, and
   in the close control, the fine adjustment is performed based on the target pressure value and the pressure value.

2. The valve device according to claim 1, wherein the control section performs open degree control in the open control and the close control based on a magnitude relationship between a reference opening degree for the target pressure value and the detected opening degree and a magnitude relationship between the target pressure value and the pressure value.

3. The valve device according to claim 2, wherein the control section divides an opening degree/pressure coordinate plane represented by an opening degree coordinate and a pressure coordinate into four regions of first, second, third, and fourth quadrants by a pressure coordinate axis and an opening degree coordinate axis passing through a target coordinate point represented by the reference opening degree and the target pressure value, and differentiates the opening degree control depending on whether a coordinate point represented by the detected opening degree and the pressure value is in the first, second, third, or fourth quadrant.

4. The valve device according to claim 3, wherein in the open control, the opening degree control is performed by any of a first opening degree control pattern, a second opening degree control pattern, and a third opening degree control pattern according to a position of the coordinate point, in the first opening degree control pattern, in the first quadrant, the opening degree of the valve body is increased or held when the predictive pressure estimation value exceeds the target pressure value, and is decreased when the predictive pressure estimation value is equal to or smaller than the target pressure value, in the second quadrant, the opening degree of the valve body is increased, and in the fourth and third quadrants, the opening degree of the valve body is decreased, in the second opening degree control pattern, in the third quadrant, the opening degree of the valve body is increased when the predictive pressure estimation value exceeds the target pressure value, and is decreased or held when the predictive pressure estimation value is equal to or smaller than the target pressure value, in the fourth quadrant, the opening degree of the valve body is decreased, and in the first and second quadrants, the opening degree of the valve body is increased, and in the third opening degree control pattern, in the first quadrant, the opening degree of the valve body is increased or held when the predictive pressure estimation value exceeds the target pressure value, and is decreased when the predictive pressure estimation value is equal to or smaller than the target pressure value, in the third quadrant, the opening degree of the valve body is increased when the predictive pressure estimation value exceeds the target pressure value, and is decreased or held when the predictive pressure estimation value is equal to or smaller than the target pressure value, in the second quadrant, the opening degree of the valve body is increased, and in the fourth quadrant, the opening degree of the valve body is decreased.

5. The valve device according to claim 3, wherein based on whether or not the coordinate point is included in a region including the target coordinate point and set by a predetermined opening degree threshold and a predetermined pressure threshold, the control section determines whether the close control or the open control is to be performed.

6. The valve device according to claim 5, wherein the region set by the predetermined pressure threshold is a range of a predetermined pressure deviation around the target pressure value, the control section switches between the close control and the open control based on whether or not the pressure value is within the predetermined pressure deviation, and in a case where the open control is switched to the close control, the predetermined pressure deviation in the first and third quadrants is smaller than that in the second and fourth quadrants.

7. The valve device according to claim 3, wherein a target opening degree estimation value when it is assumed that the pressure value reaches the target pressure value by a change in the opening degree of the valve body is used as the reference opening degree.

8. The valve device according to claim 7, wherein the control section determines switching from the open control to the close control based on whether or not the detected opening degree is within a predetermined opening degree range around the target opening degree estimation value, and sets a larger predetermined opening degree range for a lower estimation accuracy of the target opening degree estimation value.

9. The valve device according to claim 4, wherein the control section performs the close control after the opening degree of the valve body has been changed to the reference opening degree by the open control.

10. The valve device according to claim 9, wherein the control section switches the close control to the open control when a difference between the pressure value and the target pressure value exceeds a predetermined pressure threshold upon the fine adjustment by the close control.

11. The valve device according to claim 2, wherein the predictive pressure estimation value is computed in such a manner that a planned opening degree value indicating a temporarily-set process until the prediction target time in an opening degree changing process from the detected opening degree to the reference opening degree and an introduced gas flow rate estimation value obtained according to an exhaust expression of $V \times (dP/dt) + S \times P = Qin$ or an introduced gas flow rate input value as introduced gas flow rate information input from other components than the valve device are applied to a relational expression obtained by discretization of a general solution of the exhaust expression, where V is a volume of the vacuum chamber, P is a pressure of the vacuum chamber, S is an exhaust velocity according to an opening degree, and Qin is a flow rate of gas introduced into the vacuum chamber.

12. The valve device according to claim 11, wherein the predictive pressure estimation value is set and computed in such a manner that a current value of the detected opening degree is fixed during the prediction target time and a current estimation value of the introduced gas flow rate input value or the introduced gas flow rate estimation value is fixed.

13. The valve device according to claim 1, wherein the prediction target time is, with reference to a drive time required for a change in the valve body opening degree between a minimum value and a maximum value of the valve conductance, set to one to 0.1 times of the drive time.

\* \* \* \* \*